US012377744B2

(12) United States Patent
Akhavan-Tafti

(10) Patent No.: US 12,377,744 B2
(45) Date of Patent: Aug. 5, 2025

(54) ON-DEMAND ELECTRIC CHARGE SERVICE

(71) Applicant: THE REGENTS OF THE UNIVERSITY OF MICHIGAN, Ann Arbor, MI (US)

(72) Inventor: Mojtaba Akhavan-Tafti, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 274 days.

(21) Appl. No.: 17/881,686

(22) Filed: Aug. 5, 2022

(65) Prior Publication Data

US 2022/0379762 A1 Dec. 1, 2022

Related U.S. Application Data

(63) Continuation-in-part of application No. 16/552,392, filed on Aug. 27, 2019, now Pat. No. 11,420,530, (Continued)

(51) Int. Cl.
*B60L 53/38* (2019.01)
*B60L 53/12* (2019.01)
(Continued)

(52) U.S. Cl.
CPC ............... *B60L 53/38* (2019.02); *B60L 53/12* (2019.02); *B60L 53/14* (2019.02); *B60L 53/50* (2019.02);
(Continued)

(58) Field of Classification Search
CPC ........ B60L 53/68; B60L 53/62; B60L 53/305; B60L 53/35; B60L 53/65; B60L 53/12; B60L 53/14; H02J 7/342; H02J 7/025
See application file for complete search history.

(56) References Cited

U.S. PATENT DOCUMENTS 4,106,952 A 8/1978 Kravitz
4,224,082 A 9/1980 Jacobson
(Continued)

FOREIGN PATENT DOCUMENTS

BR 9000510 A 1/1991
CN 103384920 A 11/2013
(Continued)

OTHER PUBLICATIONS

International Search Report and Written Opinion mailed Apr. 29, 2020 regarding PCT/US2019/026580.
(Continued)

*Primary Examiner* — Carlos Amaya
(74) *Attorney, Agent, or Firm* — Reising Ethington P.C.

(57) ABSTRACT

In an on-demand electric charge service, a plurality of mobile power transmitters or donors deliver electric charge to one or a plurality of compatible power receivers, or vice versa. Alternatively, a plurality of mobile power receivers or donors and a plurality of power receivers or recipients form nodes of a peer-to-peer charge service, such as in a hub-spoke or a block-chain configuration. A system and/or method for establishing a charge session in an on-demand electric charge service comprises a request processing unit for receiving a charge session request for one or a plurality of power receivers or one or a plurality of mobile power transmitters, and at least one user dataset or one provider dataset.

16 Claims, 18 Drawing Sheets

Related U.S. Application Data which is a continuation-in-part of application No. 16/377,513, filed on Apr. 8, 2019, now abandoned.

(60) Provisional application No. 62/654,707, filed on Apr. 9, 2018.

(51) Int. Cl.
| | |
|---|---|
| *B60L 53/14* | (2019.01) |
| *B60L 53/50* | (2019.01) |
| *B60L 53/62* | (2019.01) |
| *B60L 53/65* | (2019.01) |
| *H02J 50/40* | (2016.01) |
| *H02J 50/80* | (2016.01) |
| *H02J 50/90* | (2016.01) |

(52) U.S. Cl.
CPC .............. *B60L 53/62* (2019.02); *B60L 53/65* (2019.02); *H02J 50/40* (2016.02); *H02J 50/80* (2016.02); *H02J 50/90* (2016.02)

(56) References Cited

U.S. PATENT DOCUMENTS

| | | | |
|---|---|---|---|
| 4,331,829 A | 5/1982 | Palazzetti et al. | |
| 4,338,480 A | 7/1982 | Antypas et al. | |
| 4,441,143 A | 4/1984 | Richardson, Jr. | |
| 4,746,370 A | 5/1988 | Woolf | |
| 5,009,243 A | 4/1991 | Barker | |
| 5,068,865 A | 11/1991 | Ohshima et al. | |
| 5,110,368 A | 5/1992 | Otto et al. | |
| 6,060,658 A | 5/2000 | Yoshida et al. | |
| 6,087,579 A | 7/2000 | Muskatevc | |
| 6,223,675 B1 | 5/2001 | Watt et al. | |
| 7,797,939 B2 | 9/2010 | Green | |
| 8,146,527 B2 | 4/2012 | Pellen | |
| 8,553,742 B1 | 10/2013 | Wu | |
| 8,664,514 B2 | 3/2014 | Watters | |
| 8,787,420 B2 | 7/2014 | Kimoto et al. | |
| 8,860,165 B2 | 10/2014 | Okaniwa et al. | |
| 8,963,704 B2 | 2/2015 | Adami | |
| 9,048,609 B2 | 6/2015 | Kim | |
| 9,059,558 B2 | 6/2015 | Zhu et al. | |
| 9,158,178 B2 | 10/2015 | Smeeton et al. | |
| 9,172,207 B2 | 10/2015 | Chen | |
| 9,180,551 B2 | 11/2015 | Paganelli | |
| 9,203,212 B2 | 12/2015 | Kurobe et al. | |
| 9,592,742 B1 | 3/2017 | Sosinov et al. | |
| 10,027,412 B2 | 7/2018 | Eroglu et al. | |
| 11,145,046 B2 | 10/2021 | Lakshmanan et al. | |
| 11,245,469 B2 | 2/2022 | Lakshmanan et al. | |
| 2004/0149988 A1 | 8/2004 | Shiozaki et al. | |
| 2006/0266407 A1 | 11/2006 | Lichy et al. | |
| 2007/0012353 A1 | 1/2007 | Fischer et al. | |
| 2008/0000518 A1 | 1/2008 | Basol | |
| 2008/0245401 A1 | 10/2008 | Winston et al. | |
| 2008/0289682 A1 | 11/2008 | Adriani et al. | |
| 2009/0009847 A1 | 1/2009 | Sasagawa et al. | |
| 2009/0040750 A1 | 2/2009 | Myer | |
| 2009/0272424 A1 | 11/2009 | Ortabasi | |
| 2009/0272425 A1 | 11/2009 | Green | |
| 2010/0089436 A1 | 4/2010 | Watters | |
| 2010/0212717 A1 | 8/2010 | Whitlock et al. | |
| 2010/0236609 A1 | 9/2010 | Tweedie | |
| 2011/0017256 A1 | 1/2011 | Stevens | |
| 2011/0025267 A1* | 2/2011 | Kamen ................. | B60L 53/665 320/109 |
| 2011/0056534 A1 | 3/2011 | Ding et al. | |
| 2011/0061717 A1 | 3/2011 | Kwon et al. | |
| 2011/0232211 A1 | 9/2011 | Farahi | |
| 2011/0278440 A1 | 11/2011 | Chan et al. | |
| 2011/0290296 A1 | 12/2011 | Daniel et al. | |
| 2011/0305010 A1 | 12/2011 | Leadford et al. | |
| 2012/0031018 A1 | 2/2012 | Kapany | |
| 2012/0080078 A1 | 4/2012 | Farrelly et al. | |
| 2012/0118359 A1 | 5/2012 | Battistutti | |
| 2012/0240982 A1 | 9/2012 | Corneille | |
| 2013/0038919 A1 | 2/2013 | Gibson et al. | |
| 2013/0112239 A1 | 5/2013 | Liptac et al. | |
| 2013/0174896 A1 | 7/2013 | Ardo et al. | |
| 2013/0192656 A1 | 8/2013 | Hardin et al. | |
| 2013/0192662 A1 | 8/2013 | Snidow | |
| 2013/0200709 A1 | 8/2013 | Kirchner et al. | |
| 2013/0346166 A1 | 12/2013 | Chihara | |
| 2014/0130851 A1 | 5/2014 | Osamura et al. | |
| 2015/0034147 A1 | 2/2015 | Le Perchec et al. | |
| 2015/0101761 A1 | 4/2015 | Moslehi et al. | |
| 2015/0144191 A1 | 5/2015 | Declerck et al. | |
| 2015/0336669 A1 | 11/2015 | Kantor et al. | |
| 2016/0049799 A1 | 2/2016 | Takatsu et al. | |
| 2016/0254781 A1 | 9/2016 | Pisharodi | |
| 2017/0077867 A1 | 3/2017 | Hohulin | |
| 2017/0170776 A1 | 6/2017 | Janowski | |
| 2017/0174092 A1 | 6/2017 | Kohnke | |
| 2018/0072177 A1* | 3/2018 | Tremblay ................ | B60L 53/65 |
| 2018/0076758 A1 | 3/2018 | Miranda | |
| 2019/0252565 A1 | 8/2019 | Lyons | |
| 2019/0323733 A1 | 10/2019 | Lv | |
| 2020/0177026 A1 | 6/2020 | Sosinov et al. | |
| 2022/0060142 A1 | 2/2022 | Akhavan-Tafti | |
| 2022/0379762 A1 | 12/2022 | Akhavan-Tafti | |

FOREIGN PATENT DOCUMENTS

| | | |
|---|---|---|
| CN | 207701042 U | 8/2018 |
| GB | 2479024 A | 9/2011 |
| JP | 3220934 B2 | 10/2001 |
| JP | 2003346521 A | 12/2003 |
| JP | 2017127040 A | 7/2017 |
| JP | 6376732 B2 | 8/2018 |
| KR | 10-2010-0027379 A | 3/2010 |
| KR | 100973774 B1 | 8/2010 |
| KR | 20120013745 A | 2/2012 |
| KR | 20140028179 A | 3/2014 |
| KR | 20160015716 A | 2/2016 |
| KR | 20160043902 A | 4/2016 |
| KR | 20160133838 A | 11/2016 |
| KR | 20160142014 A | 12/2016 |
| KR | 20170024300 A | 3/2017 |
| KR | 20190118689 A | 10/2019 |
| WO | 2012/166048 A1 | 12/2012 |
| WO | 2012/173350 A2 | 12/2012 |
| WO | 2015-009482 A2 | 1/2015 |
| WO | 2015196296 A1 | 12/2015 |
| WO | 2016187328 A1 | 11/2016 |
| WO | 2017-097772 A1 | 6/2017 |

OTHER PUBLICATIONS

International Search Report and Written Opinion of the International Searching Authority regarding International Patent Application No. PCT/US2022/016614, dated May 31, 2022.
International Search Report regarding International Application No. PCT/US2021/047268 Dated Decmeber 21, 2021.
International Search Report and Written Opinion of the International Searching Authority issued in PCT/US2018/049880, mailed Nov. 21, 2018; ISA/US.
"3M Ultra Barrier Solar Film 510-F." 3M™ Ultra Barrier Solar Film 510-F, 3M, Oct. 2016, https://multimedia.3m.com/mws/media/12854700/3m-ultra-barrier-solar-film-510-f.pdf. (Year: 2016).
Liu, Ji-Tao, et al. "Curing Determination of EVA for Solar Panel Application by DSC." Curing Determination of EVA for Solar Panel Application, PerkinElmer, Inc, 2010, https://www.s4science.at/wordpress/wp-content/uploads/2018/10/EVA-Curing-for-Solar-Panels_DSC8000_APP .pdf. (Year: 2010).
Tomoyoshi Motohiro et al., "Concept of the solar-pumped laser-photovoltaics combined system and its application to laser beam power feeding to electric vehicles", Japanese Journal of Applied Physics, 2017.
International Search Report and Written Opinion of the International Searching Authority issued in PCT/US2020/059262, mailed Feb. 26, 2021, ISA/US.

(56) References Cited

OTHER PUBLICATIONS

D.-R. Kim, S.-H. Yang, H.-S. Kim, Y.-H. Son, and S.-K. Han, "Outdoor Visible Light Communication for inter-vehicle communication using Controller Area Network," in 2012 Fourth International Conference on Communications and Electronics (ICCE), Hue, Vietnam, Aug. 2012, pp. 31-34. doi: 10.1109/CCE.2012.6315865.
Wang, Yiguang, Xingxing Huang, Jianyang Shi, Yuan-quan Wang, and Nan Chi. "Long-Range High-Speed Visible Light Communication System over 100-m Outdoor Transmission Utilizing Receiver Diversity Technology." Optical Engineering 55, No. 5 (May 2016): 056104.
Kim, Yong Hyeon, Willy Anugrah Cahyadi, and Yeon Ho Chung. "Experimental Demonstration of VLC-Based Vehicle-to-Vehicle Communications Under Fog Conditions." IEEE Photonics Journal 7, No. 6 (Dec. 2015): 1-9.
Rodriguez, Juan, Diego G. Lamar, Daniel G. Aller, Pablo F. Miaja, and Javier Sebastian. "Efficient Visible Light Communication Transmitters Based on Switching-Mode DC-DC Converters." Sensors 18, No. 4 (Apr. 2018): 1127.
Vega-Colado, César, Belén Arredondo, Juan Carlos Torres, Eduardo López-Fraguas, Ricardo Vergaz, Diego Martin-Martin, Gonzalo Del Pozo, et al. "An All-Organic Flexible Visible Light Communication System." Sensors 18, No. 9 (Sep. 2018): 3045.
Gordon Povey, "An IEEE Standard For Visible Light Communications", Visible Light Communications, Apr. 7, 2011.
"Shedding Light on LiFi", Pure LiFi, Aug. 2017.
"Deok Rae Kim et al., "Outdoor Visible Light Communication For Inter-Vehicle Communication Using Control Area Network", ICCE, 2012 (pp. 31-34)."
Harald Haas, "LiFi is a Paradigm-Shifting 5G Technology", Reviews in Physics, Oct. 27, 2017.
Mohamed Sufyan Islim et al., "The Impact of Solar Irradiance on Visible Light Communications", Journal of Lightwave Technology, vol. 36, No. 12, Jun. 15, 2018.
Saeed Ur Rehman et al., "Visible Light Communication: A System Perspective—Overview and Challenges", Sensors, Mar. 7, 2019.
Bugra Turan et al., "Vehicular Visible Light Communications", Intech, 2017.
Alin-Mihai Cailean et al.,"A Survey on the Usage of DSRC and VLC in Communication-Based Vehicle Safety Applications", IEEE, 2014.
Cen Liu, "Enabling Vehicular Visible Light Communication (V2LC) Networks", VANET'11, Sep. 23, 2011.
Arnez Pramesti Ardi et al., "VLC-Based Car-to-Car Communication", Jurnal Elecktronika dan Telekomunikasi (JET), vol. 20, No. 1, Aug. 2020, pp. 16-22.
Trong-Hop Do et al., "Potentialities and Challenges of VLC Based Outdoor Positioning", IEEE, 2015.
Hossien B. Eldeeb et al., "Vehicle-to-Vehicle Light Communication: How to Select Receiver Locations for Optimal Performance", IEEE.
Mohammed Elamassie et at., "Effect of Fog and Rain on the Performance of Vehicular Visible Light Communications", IEEE, 2018.
Hossien B. Eldeeb et al., "MAC Layer Performance of Multi-Hop Vehicular VLC Networks with CSMA/CA", 12th International Symposium on Communication Systems, Networks and Digital Signal Processing, 2020.
Harald Haas et al., "What is LiFi?", Journal of Lightwave Technology, IEEE, 2015.
Harald Haas et al., "Introduction to Indoor Networking Concepts and Challenges in LiFi", Journal of Optical Communications and Networking, vol. 12, No. 2, Feb. 2020.
Pable Palacios Jativa et al., "Performance Analysis of OFDM-Based VLC Schemes in NLOS Channels", IEEE, Downloaded May 16, 2021.
S. Sivaguru, "A High Speen Open Access Visible Light Communication System Based on Intensity Modulation", International Journal of Science Technology & Engineering, vol. 3, Issue 08, Feb. 2017.
Rahul R. Sharma et al., "Implementation of a Simple Li-Fi Based System", International Journal of Computing and Technology, vol. 1, Issue 9, Oct. 2014.
Tahmid H. Talukdar et al., "Small Scale Wireless Data Transmission via Light Using Light Source", Proceedings of the International Conference on Engineering Research, Innovation, and Education 2017.
Soumyajit Chatterjee, "Point-to-Point Digital Communication using VLC (Visible Light Communication) and LiFi Technology", IEEE.
Chinese Office Action regarding Patent Application No. 201880072200.4, dated Sep. 21, 2023.
International Search Report and Written Opinion of the ISA issued in PCT/US2023/029454, mailed Nov. 21, 2023; ISA/US.
Chinese Office Action regarding Patent Application No. 2018800722004, dated Mar. 7, 2023.
Chinese Office Action regarding Patent Application No. 201880072200.4, dated Feb. 22, 2024.
Extended European Search Report regarding Patent Application No. 20884793.9, dated Oct. 16, 2023.
Chinese Office Action regarding Patent Application No. 201880072200.4, dated Jul. 1, 2024.
Extended European Search Report regarding EP Application No. 218625358 dated Jul. 26, 2024.
German Office Action regarding Patent Application No. 112018004929.9, dated Sep. 19, 2024.
Chinese Office Action regarding Chinese Application No. 2018800722004, dated Sep. 19, 2024.

* cited by examiner

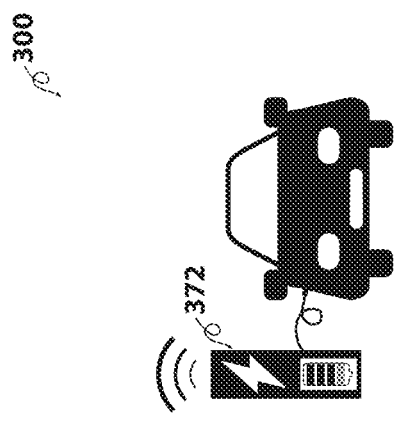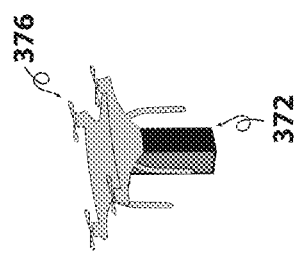
FIG. 17

ON-DEMAND ELECTRIC CHARGE SERVICE

CROSS-REFERENCE TO RELATED APPLICATIONS

This application is a continuation-in-part of U.S. patent application Ser. No. 16/552,392 filed on Aug. 27, 2019, which is a continuation-in-part of U.S. patent application Ser. No. 16/377,513 filed on Apr. 8, 2019, which claims the benefit and priority of U.S. Provisional Application No. 62/654,707 filed on Apr. 9, 2018. The entire disclosures of the above-referenced applications are incorporated herein by reference.

FIELD

The present disclosure relates to charging and, more particularly, relates to systems and methods for charging a power receiver with a mobile power transmitter.

BACKGROUND AND SUMMARY

This section provides background information related to the present disclosure that is not necessarily prior art. This section provides a general summary of the disclosure, and is not a comprehensive disclosure of its full scope or all of its features.

With the recent popularity of electric consumers (EC), increasing effort is focused on addressing several challenges associated with battery-operated devices: 1) the low charge capacity of batteries requires frequent charging, 2) the low re-charging rate of conventional batteries, and 3) the associated scarcity and specificity of charging services.

Wire charging of EC, which requires physical contact between a power transmitter and a power receiver via a cable or other device, is currently widely accepted. Recent wireless charging capabilities that enable transferring of power via free space have also become increasingly popular.

With the size of electronic circuits shrinking, power delivery and storage are becoming more challenging. Laser-based power delivery has been proposed as a solution to create compact electronic circuits. For example, laser power beaming uses a laser to deliver concentrated light to a remote power receiver by a power transmitter. The receiver then converts the light to electricity, similar to solar powered photovoltaic (PV) cells converting sunlight into electricity.

The unprecedented dramatic market growth of Unmanned Aerial Vehicles (UAVs) is in part due to their maneuverability and small size. However, short battery life has severely restricted the range of electric powered UAVs and has proven difficult to address. Conventional systems have attempted to employ solar power, hybrid propulsion (on-board fuel-powered generators), and hydrogen fuel cells to extend UAVs' operation time; however these have not provided more than a few additional hours of operation.

Similarly, with the advancement of rechargeable batteries and hybrid engines, the number of manufactured electric vehicles continues to grow. According to the United States Department of Energy (DOE), the number of plug-in electric vehicles (PEVs) sold in the U.S. grew at rates up to 30,000 per year. China, the leading electric vehicle market in the world, has also seen significant increases in the number of manufactured and sold electric vehicles, according to China Association of Automobile Manufacturers (CAAM).

The technology improvements, cost reduction, increasing model choice, maturing charging infrastructure, and economic recovery over the past decade have positively influenced and supported the increased sales of PEVs. However, mass adoption of PEVs remains low, due in part to the small number of adequate charging stations—the number of public charging stations in the U.S. and Canada is seven times smaller than the number of gas stations.

To address customer anxiety regarding charging of PEVs, proprietary and third-party charging networks have been developed and deployed. However, these efforts to increase the number of charging stations may threaten the performance and the load capacity of the power distribution network, i.e., the power grid.

Recently, commonly-assigned PCT Application No. PCT/US2018/49880 disclosed the use of on-board electromagnetic power convertors for unlimited increase in operation time, which is incorporated herein by reference.

In accordance with the teachings of the present disclosure, a method for a power delivery system is provided wherein at least one charging service provider is a deployable mobile power transmitter (MPT) capable of delivering power to a power receiver (PR) in need of power. In some embodiments, the charging service provider is a mobile power transmitter while the power receiver can be stationary or mobile. This mobile power transmitter-to-power receiver power delivery can be done air-to-air, air-to-ground, ground-to-air, and ground-to-ground. The mobile power transmitter may operate in space, air, land, and sea. The operation may be done semi-automatically, i.e., in response to actuation by an operator, or fully automatically, i.e., involving no human intervention.

In some embodiments, the present mobile power transmitter may deliver power via a physical connector, e.g., electrical cable or fiber optic, or without any physical contact with the power receiver via non-contact mechanisms, e.g., inductive charging and electromagnetic power beaming. In some embodiments, the present method for power delivery will address the unmet need of uninterrupted and indefinite operation. In some embodiments, the present method will also provide the opportunity to receive charge at the location of the power receiver, thus, decentralizing charging services. The applications of the present teachings may include transportation and workspace robots.

Moreover, in accordance with the principles of the present disclosure, systems and methods for power delivery are provided for charging power receivers (PRs), including PEVs, via a decentralized charging network of mobile power transmitters (MPTs). Thus, a PEV has the ability to charge from an off-board electric power source. PEVs are classified into two main categories: 1) all-electric vehicles (EVs) or battery-electric vehicles (BEVs), and 2) plug-in hybrid electric vehicles (PHEVs). In general, the term PEV is used to describe devices/vehicles powered in-part or completely by electricity stored in on-board rechargeable batteries or other storage devices.

In some embodiments, a decentralized charging network of MPTs comprises a server, PRs, and a fleet of deployable MPTs having onboard charge source systems and is capable of transferring charge to a PEV at a location. The MPT deployment is managed by the server and the process is initiated by a charging request from a PEV or an operator preparing to charge a PEV.

The main advantages of a decentralized charging network include: 1) abundant MPTs, 2) time-saving, 3) operating independent of a fixed infrastructure, 4) societal and economic power resilience and security, and 5) providing access to renewable sources of energy, especially for urban PEVs. Conventional fixed charging stations are commonly supported by a power grid with a significant carbon footprint. However, in some embodiments, the present disclosure, as described and illustrated herein, provides access to deployable charging stations that can deliver charge to a location of a PEV. The MPTs can be charged with renewable sources of electricity such as wind and solar energy, therefore, lowering the economic and societal dependence on the centralized power distribution network.

There are several key differences between the present teachings and other existing technologies, such as, but not limited to: i) mobility, ii) connectivity, iii) continuous operation, iv) fast charging capability, v) decentralized power generation including renewable and clean sources of energy, vi) decentralized power delivery, vii) optional infrastructure, viii) convenience, and ix) autonomy.

"Peer-to-peer mobile charging" is a novel method of charging, wherein one EC with sufficient charge transfers charge to another EC needing charge to operate. This method of charging offers the potential to create and/or exponentially broaden a decentralized network of charging nodes—including both charge donors and recipients. This method of charging can be further classified as an economic model in which goods and resources are shared by individuals and groups in a collaborative way such that tangible and intangible assets, in this case, electrons, become services, alternatively referred to as sharing economy.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
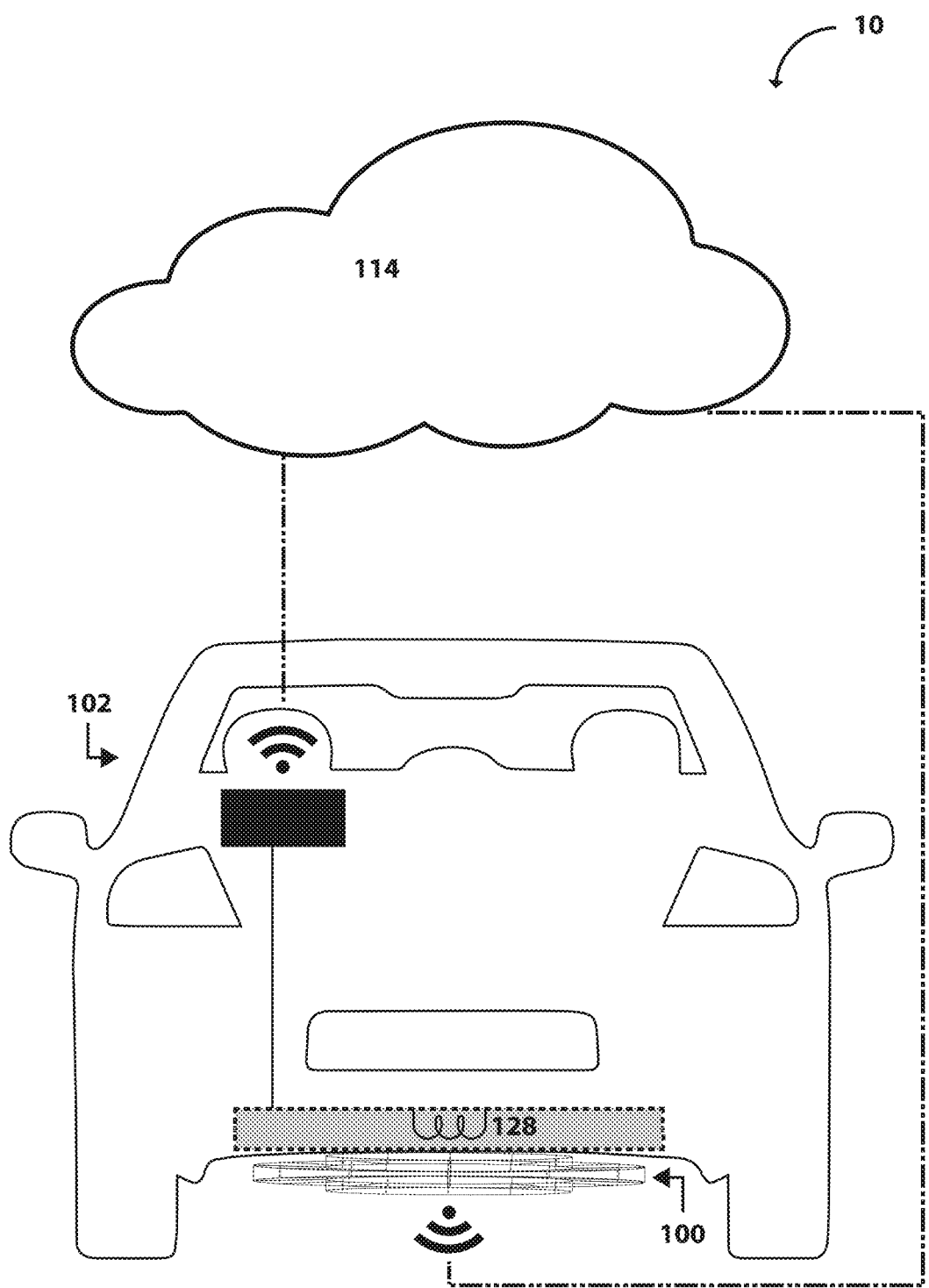

FIG. 4 illustrates a schematic view illustrating a configuration wherein a deployable MPT is capable of communicating (via the cloud or directly) with a PR's on-board control system. The MPT can attach, at least in part, to the PR while charging. This capability will allow continuous operation.

Figure 5:
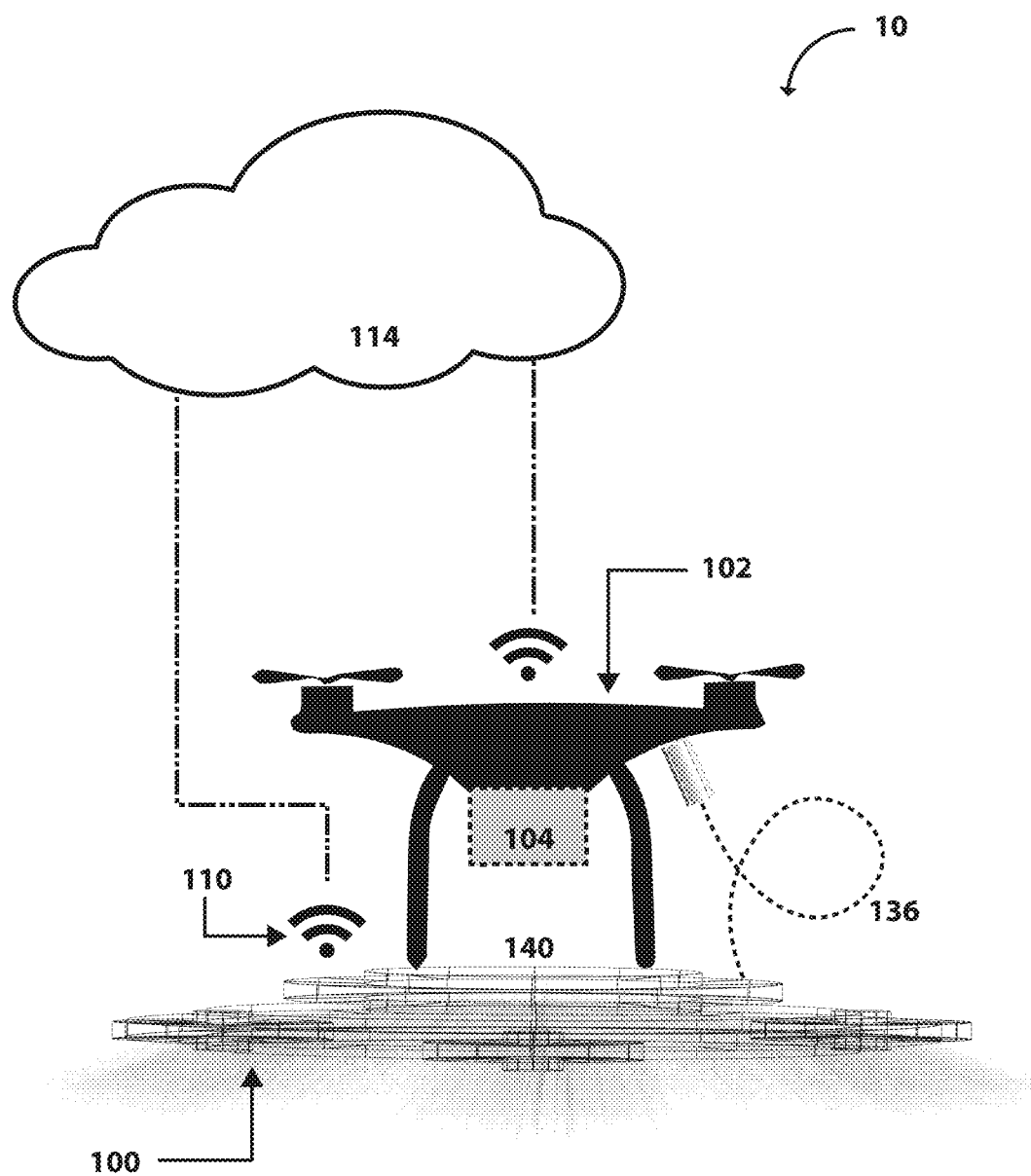

FIG. 5 illustrates a schematic view illustrating a configuration wherein a deployable MPT is capable of communicating (via the cloud or directly) with a PR's on-board control system. The MPT can land or attach to the PR while charging. The PR may carry an on-board electromagnetic storage and/or convertor unit. This capability will allow continuous operation.

Figure 6:
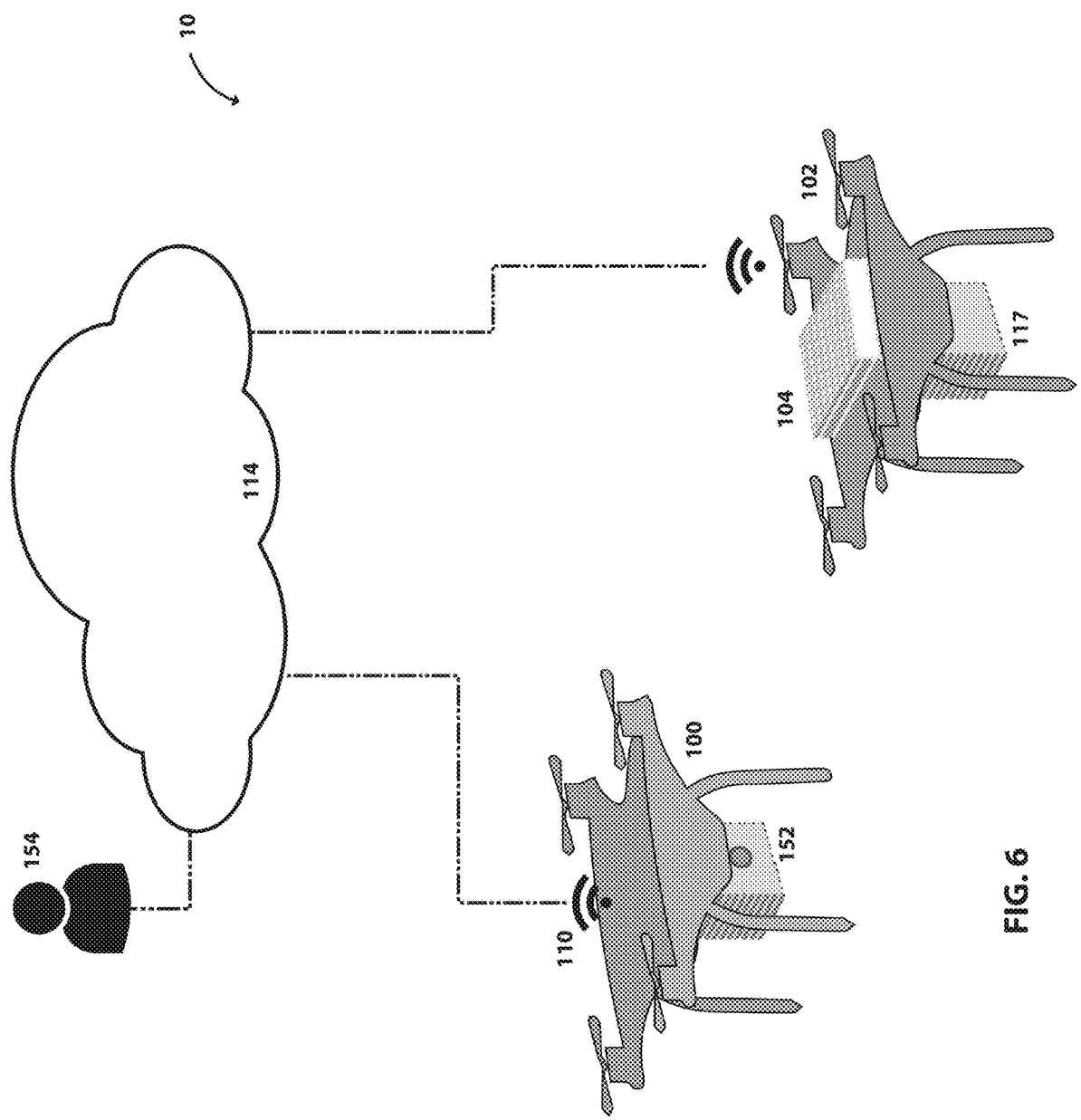

FIG. 6 illustrates a schematic view illustrating a configuration wherein a deployable MPT is capable of communicating (via the cloud or directly) with a PR's on-board control system. The MPT can track and charge the PR wirelessly while the PR continues operation. This operation can be done manually by an Operator-In-The-Loop, semi-automatically, or fully autonomously without any human intervention. The PR may carry one (or more) on-board electromagnetic storage and/or convertor units.

Figure 7:
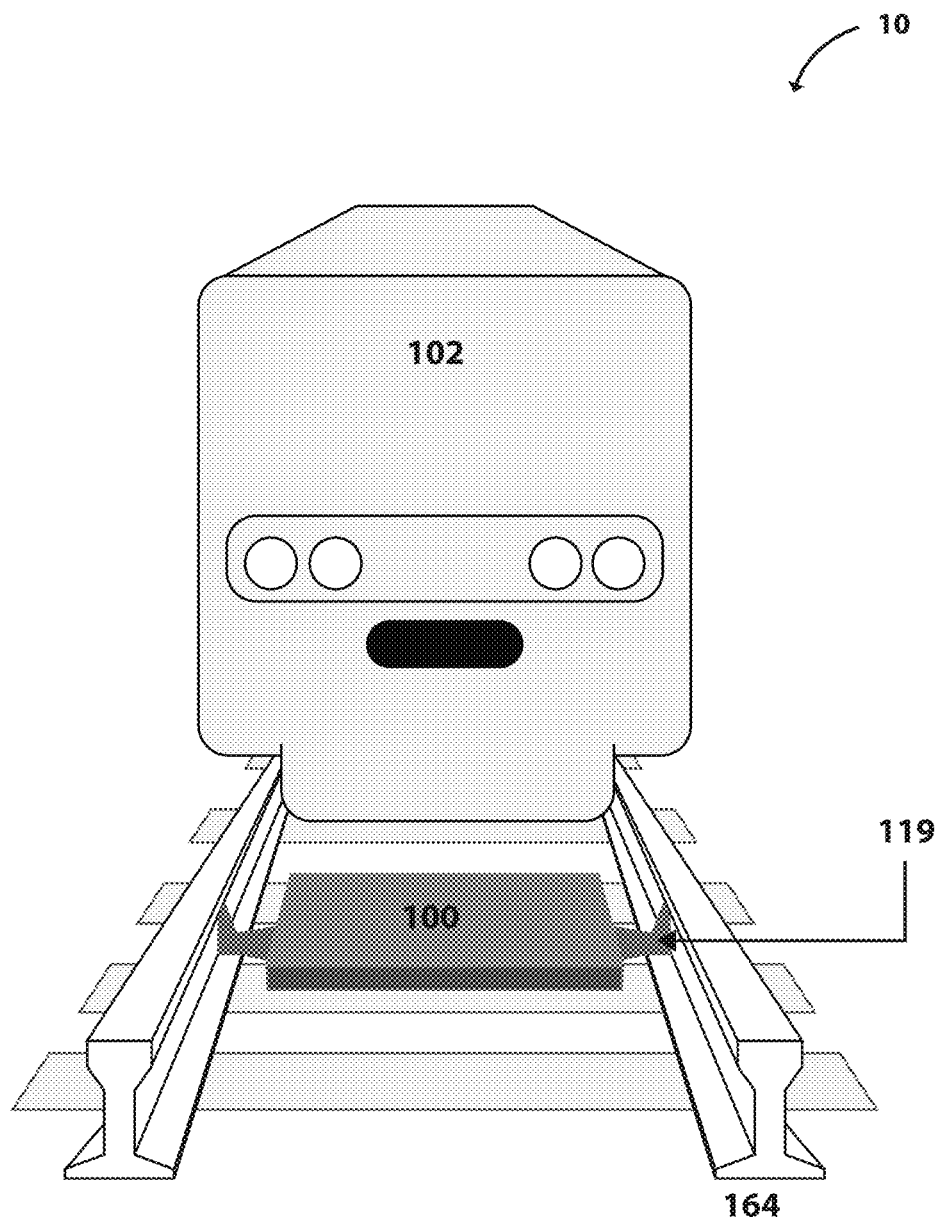

FIG. 7 illustrates a schematic view illustrating a configuration where a deployable MPT is deployed along a track member.

Figure 8:
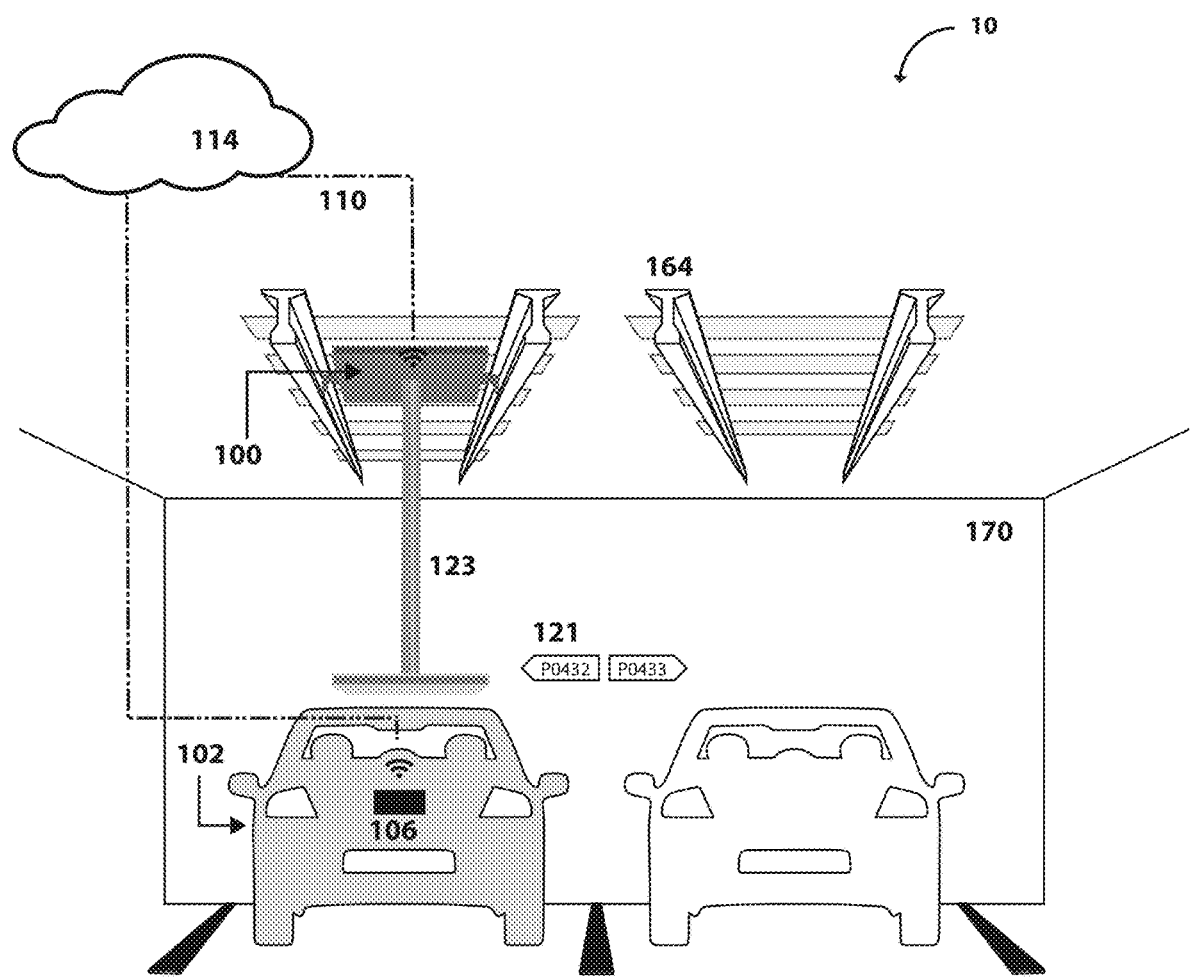

FIG. 8 illustrates a schematic view illustrating a configuration where a deployable MPT is deployed along an indoor track member.

Figure 9:
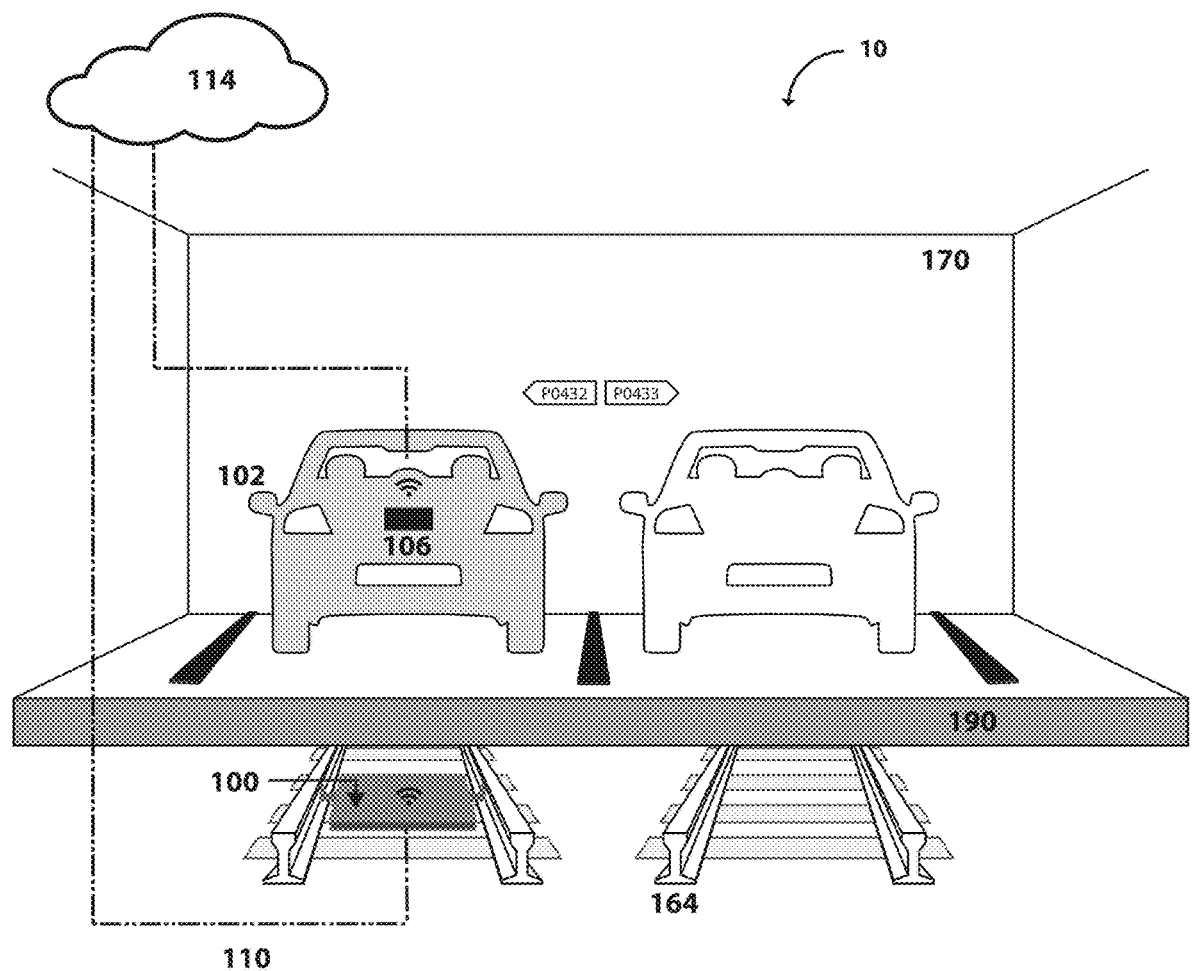

FIG. 9 illustrates a schematic view illustrating a configuration where a deployable MPT is deployed along an indoor track member below a floor surface.

Figure 10:
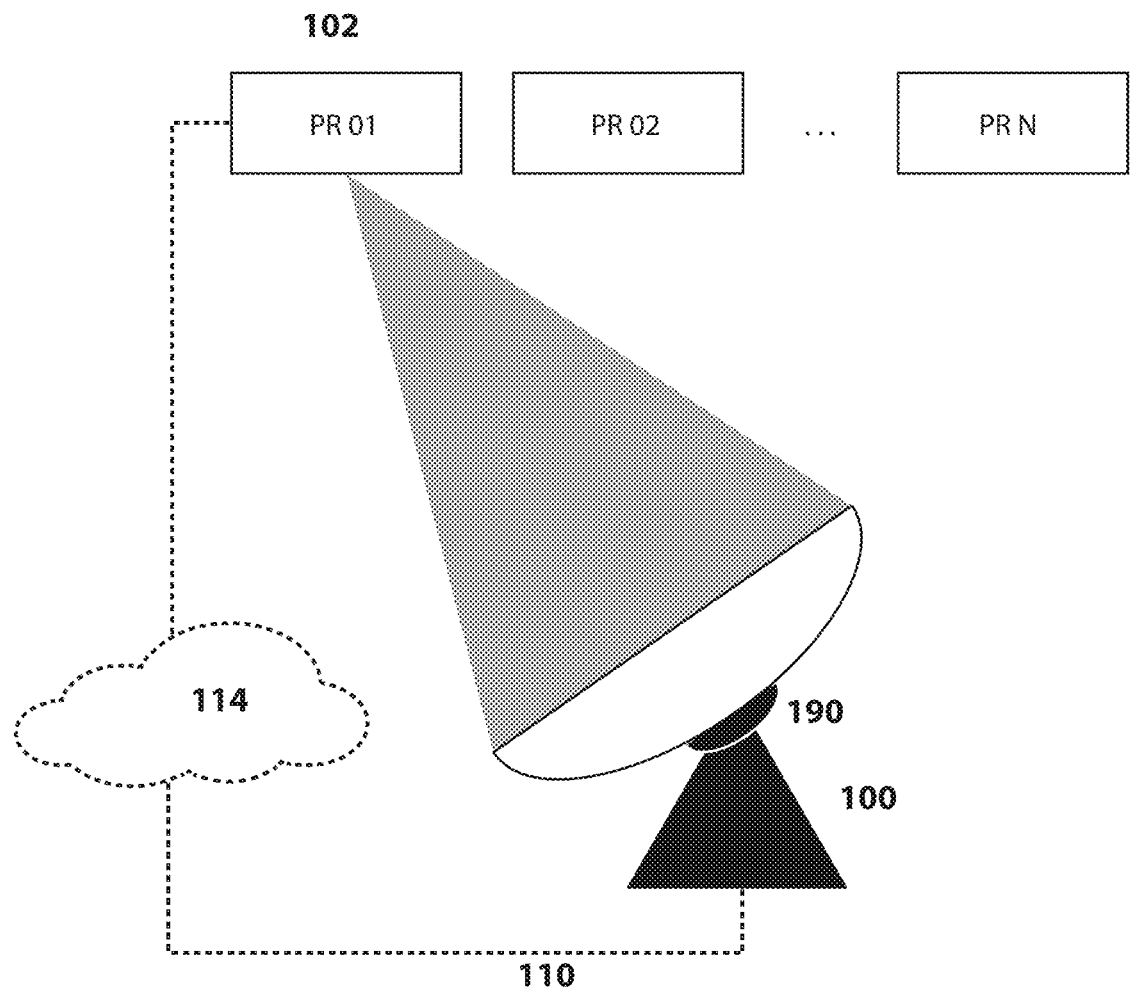

FIG. 10 illustrates a schematic view illustrating a configuration where a deployable MPT is pivotally or rotationally deployed.

Figure 11:
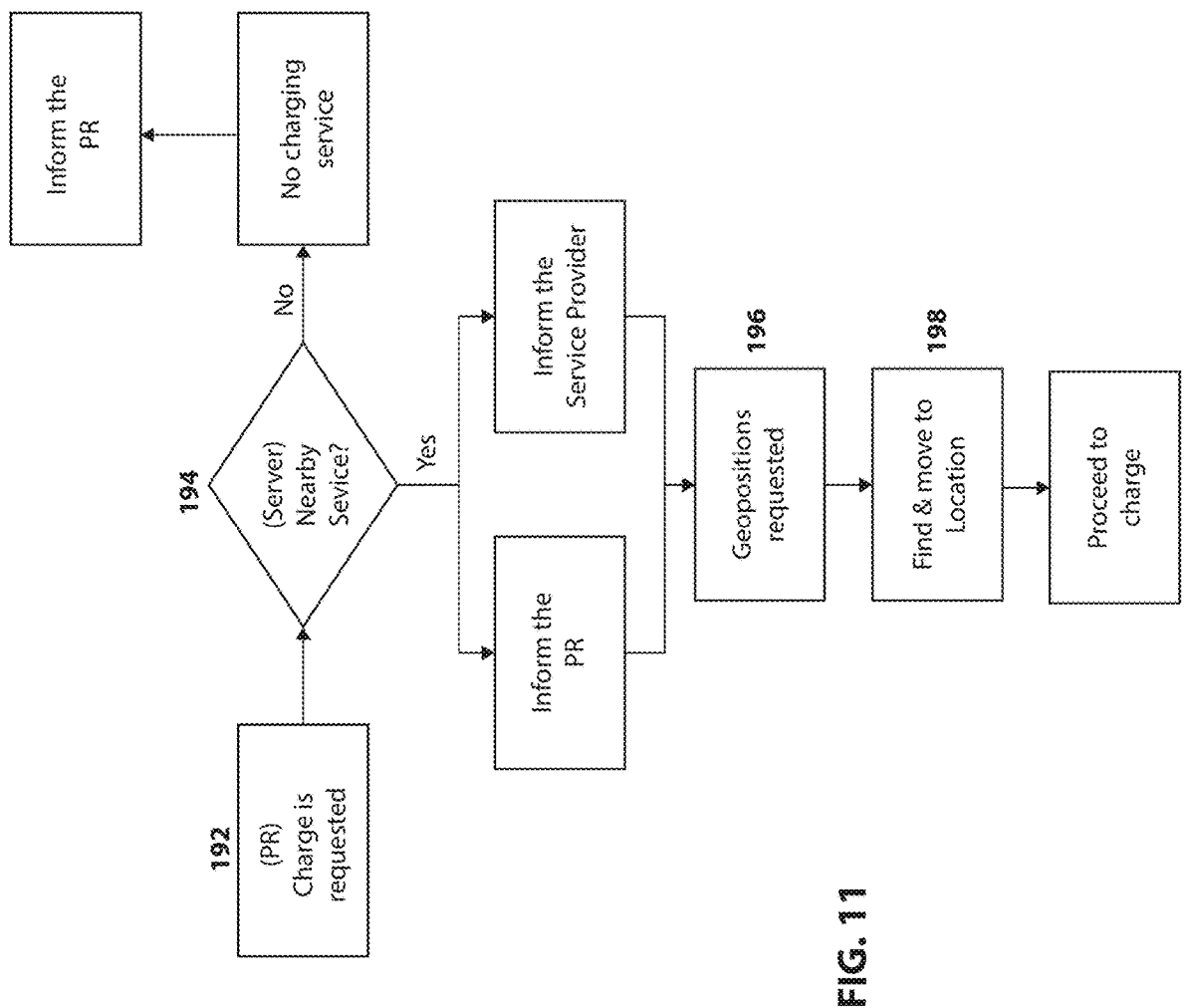

FIG. 11 illustrates a flow of an exemplary algorithm through which a PR requests (via mobile application, website, on-board communication system, etc.) and receives charging by an MPT according to some embodiments.

Figure 12:
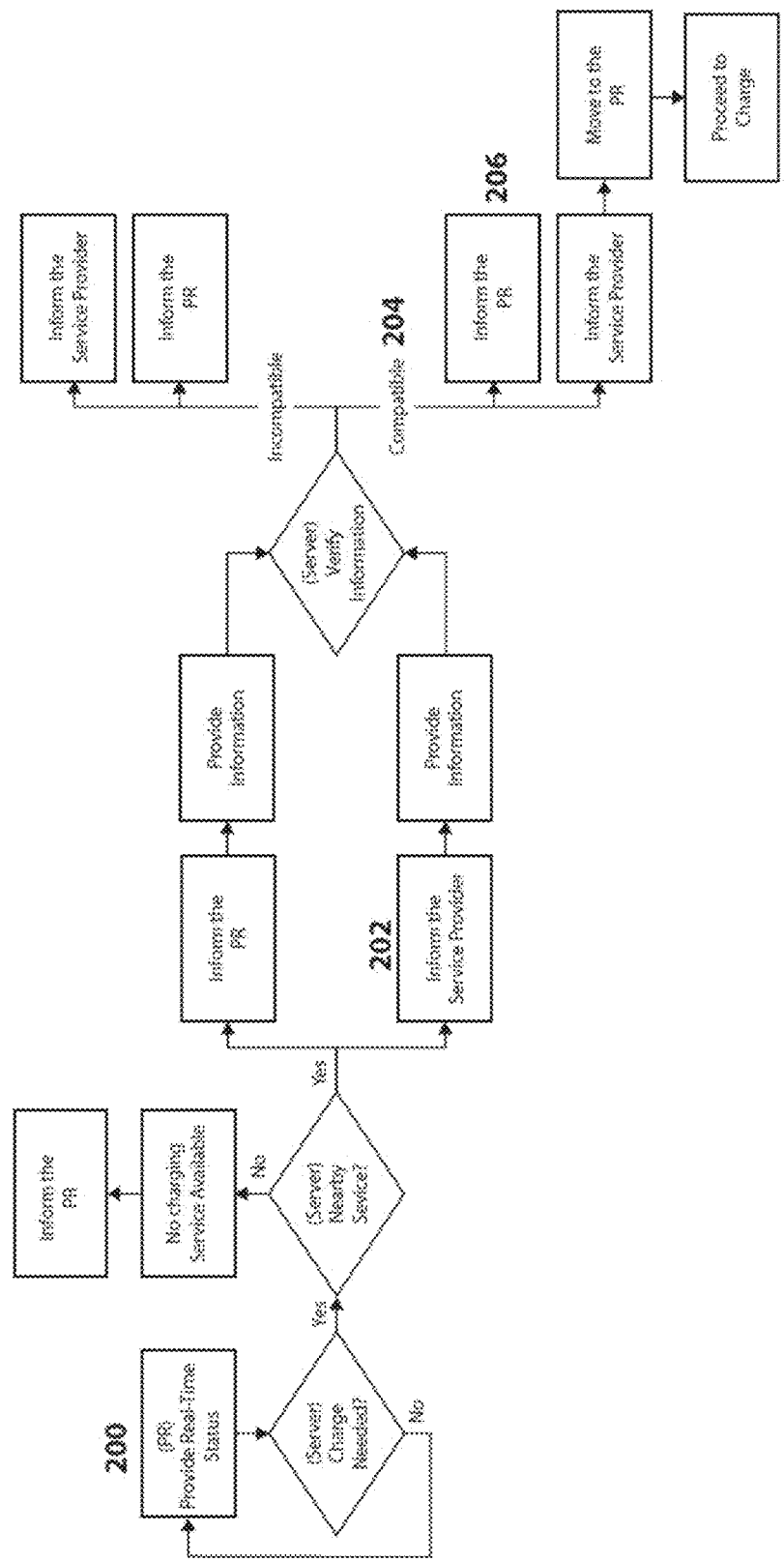

FIG. 12 illustrates a flow of an exemplary algorithm through which a PR requests (via mobile application, website, on-board communication system, etc.) and receives charging by an MPT according to some embodiments.

Figure 13:
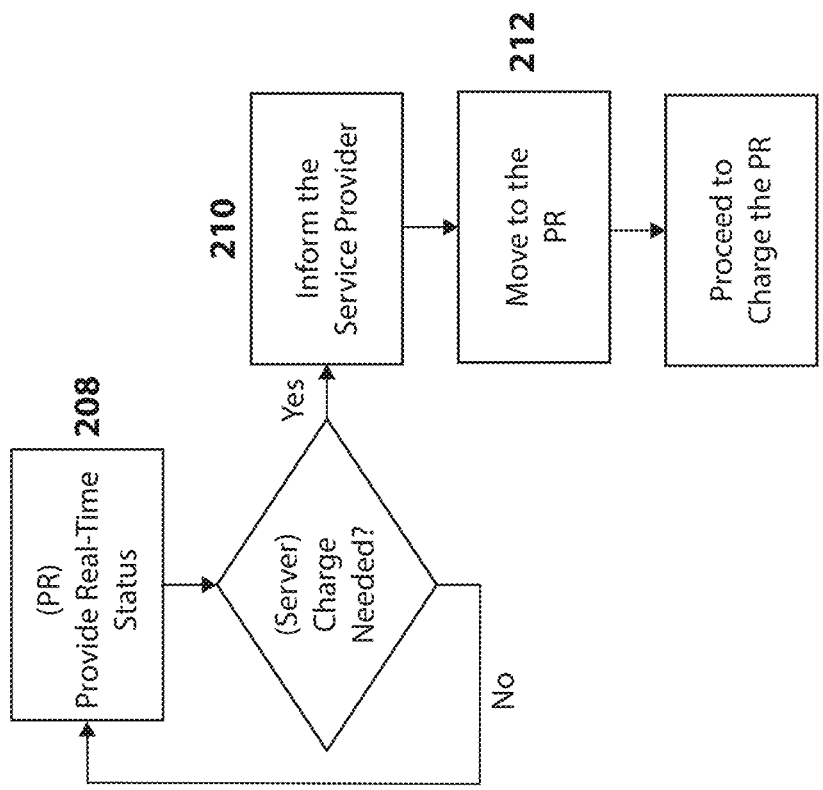

FIG. 13 illustrates a flow of an exemplary algorithm through which a PR requests (via mobile application, website, on-board communication system, etc.) and receives charging by an MPT according to some embodiments.

Figure 14:
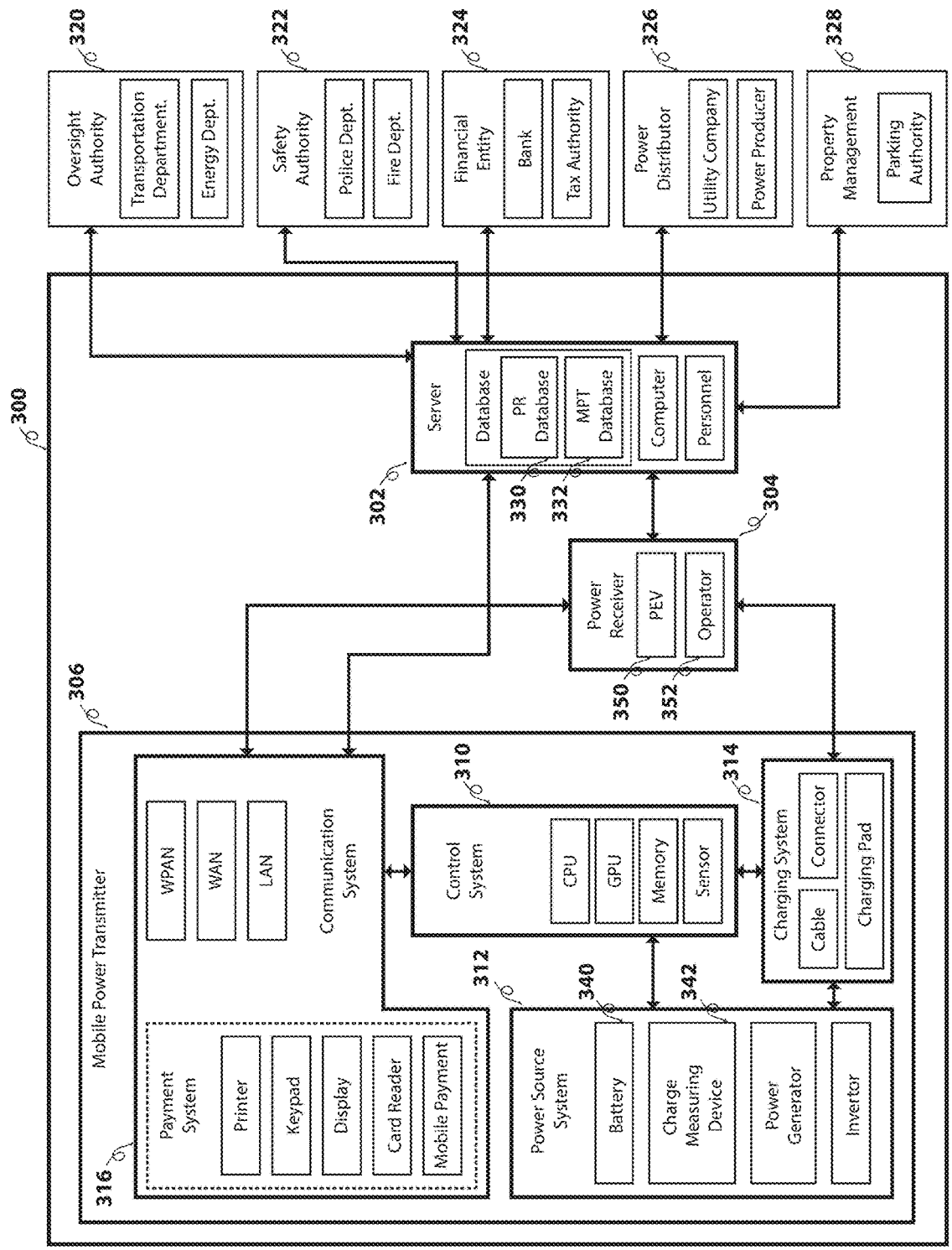

FIG. 14 illustrates a diagram of a charging network of mobile power transmitters wherein a mobile power transmitter is instructed by a server to deliver power to a power receiver.

Figure 15:
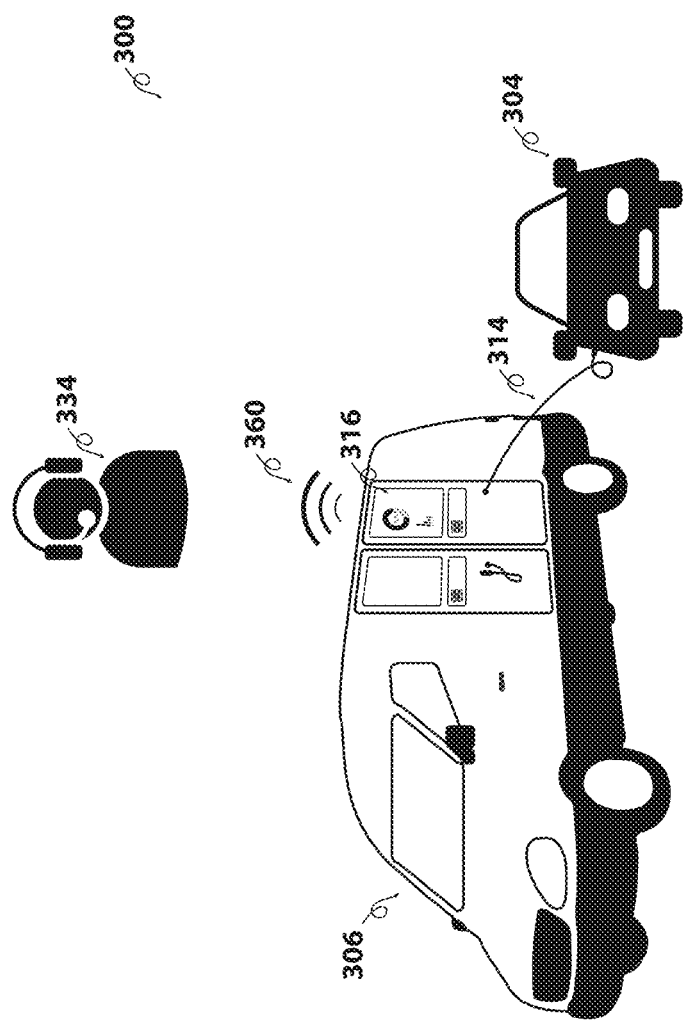

FIG. 15 illustrates a schematic illustration of a mobile power transmitter wherein charging stations aboard a vehicle deliver power to a power receiver, a plug-in electric vehicle, at a location.

Figure 16:
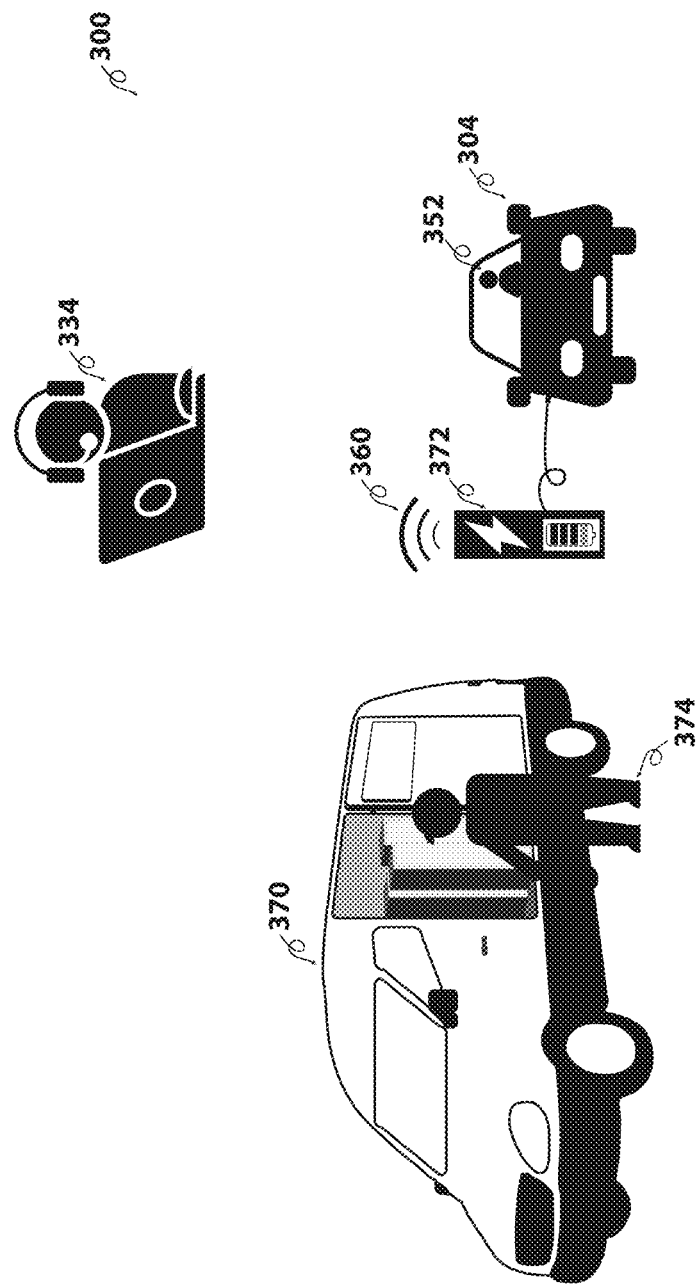

FIG. 16 illustrates a schematic illustration of a mobile power transmitter wherein a charging station is delivered to charge a power receiver, a plug-in electric vehicle, at a location.

FIG. 17 illustrates a schematic illustration of a mobile power transmitter wherein a charging station is delivered by an unmanned aerial vehicle to charge a power receiver, a plug-in electric vehicle, at a location.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In accordance with some embodiments of the present teachings, the present invention provides a mobile power transmitter (MPT) that is configured to move to a power receiver (PR) with or without human intervention and provide transmission of power from the MPT to the PR. This will allow indefinite operation for short- and long-range applications. In some embodiments, the MPT can communicate with the PR.

In the present disclosure, terms are introduced to describe various concepts. These terms include and are defined as follow:

a) A 'mobile power transmitter' (MPT) refers to a device that is capable of moving and/or adjusting its physical status to transmit power to a power receiver. The adjustment may include translational displacement that will require the mobile power transmitter to change position. In some embodiments, the adjustment may include rotation that is defined as a change in spatial orientation. In some embodiments, the mobile power transmitter will rotate toward a target power receiver.

b) A 'power receiver' (PR) refers to a device that receives power. In some embodiments, a power receiver is a device that uses power to perform a task, an example of which is a vehicle that includes, as part of its locomotion capabilities, electrical power derived from a chargeable power storage device. In some embodiments, a power receiver may convert an input power into an alternative type of power to perform a task, an example of which is a device that uses a solar panel to convert electromagnetic radiation to electricity. In some embodiments, a power receiver may store the input power. Non-limiting examples of a power receiver include electric vehicles, electronic devices, robots, drones, aircraft, boats, motorcycles, carts, scooters, spacecraft, rechargeable batteries, power storage systems, and the like.

c) 'Wireless charging' refers to transferring any form of power associated with electric fields, magnetic fields, electromagnetic fields, or otherwise from a transmitter to a receiver without the use of physical electrical conductors (e.g., power may be transferred through free space). In such configurations, the power receiver may receive the power via a "receiving coil" or any other types of electromagnetic power receivers.

Figure 1A:
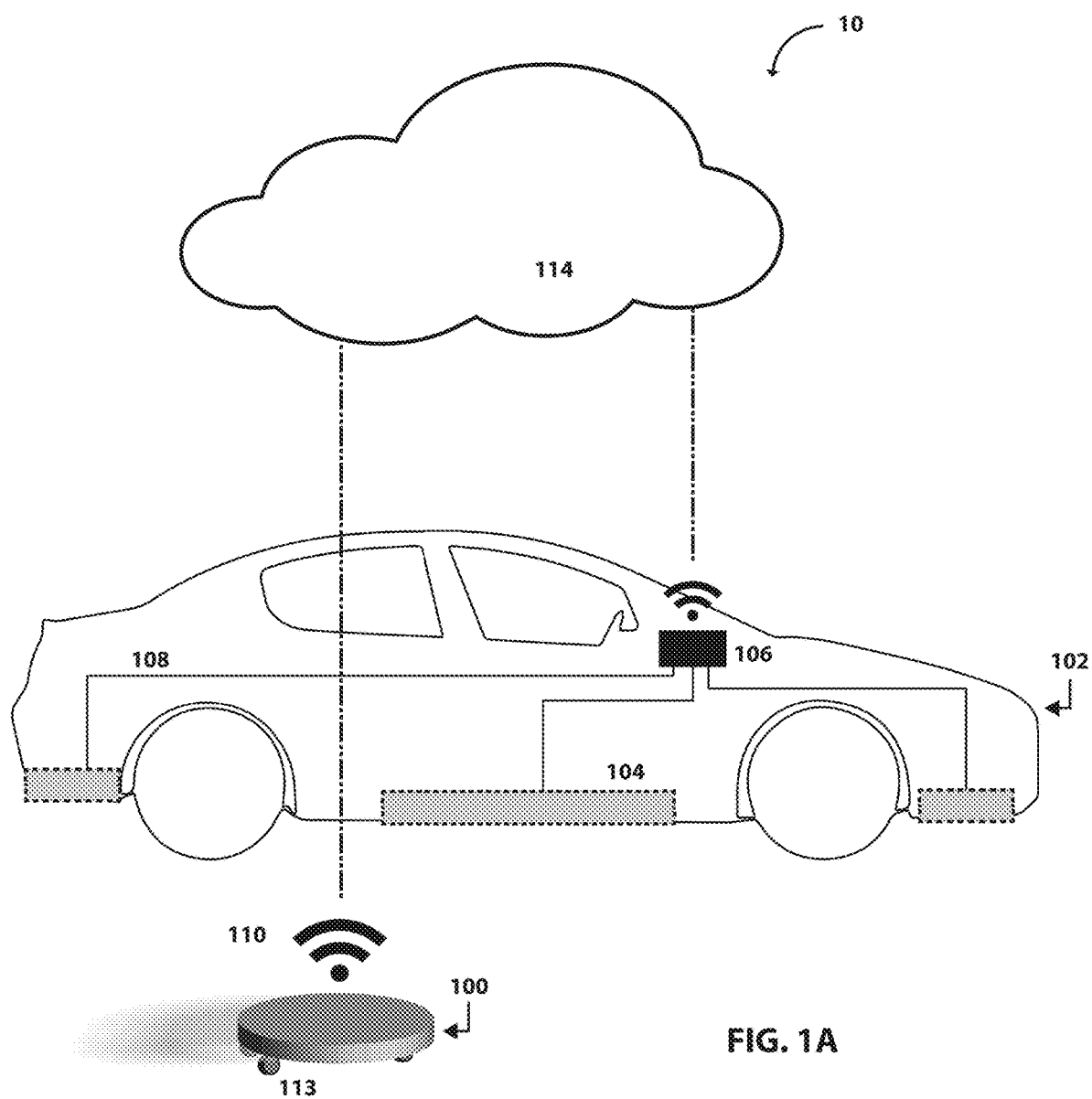
FIG. 1A illustrates an exemplary configuration wherein a deployable MPT is capable of communicating (via the cloud or directly) with a PR's on-board control system, wherein the PR is stationary or in motion.
Figure 1B:
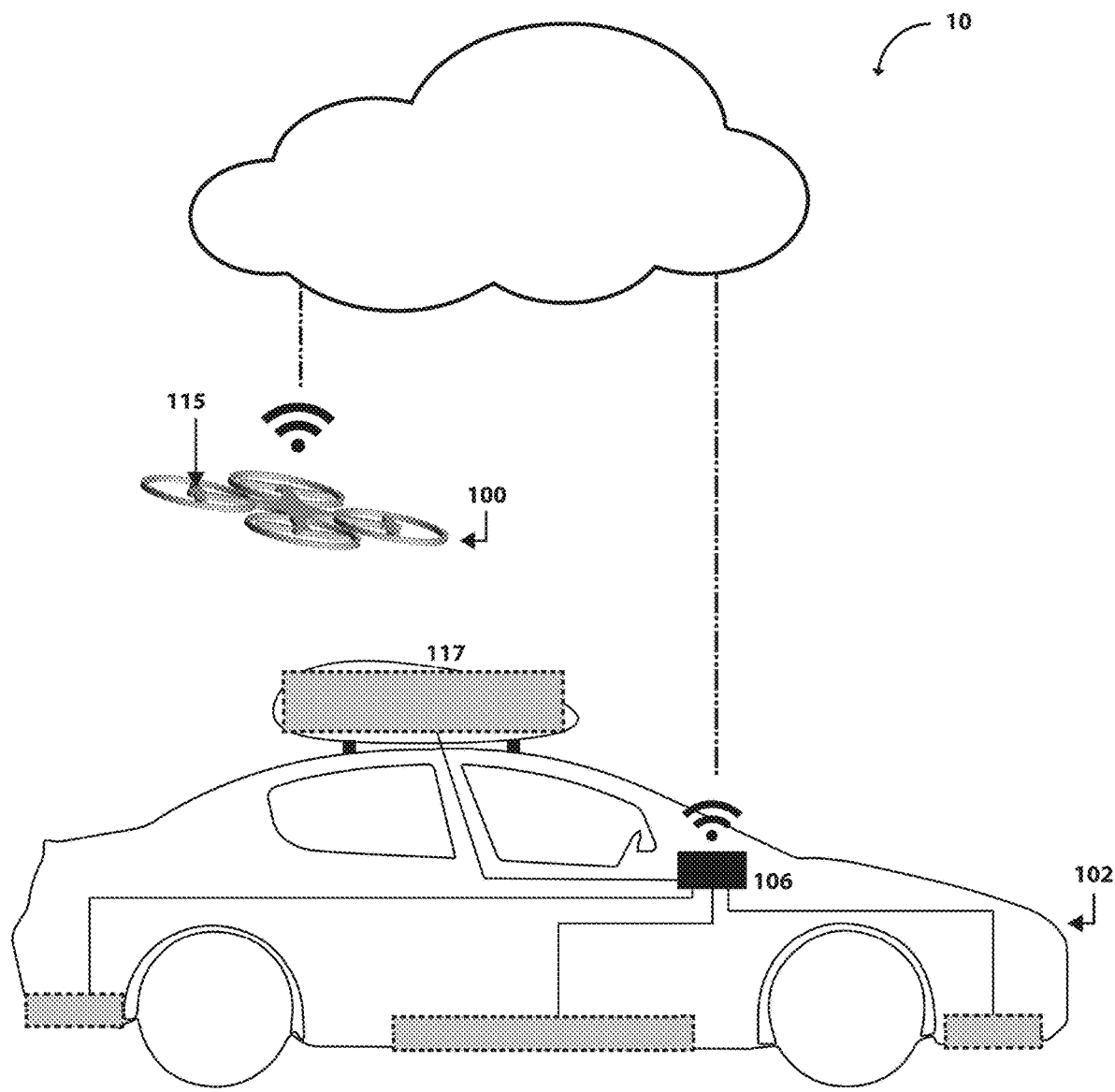
FIG. 1B illustrates a schematic view illustrating a configuration wherein a deployable MPT is capable of communicating (via the cloud or directly) with a PR's on-board control system. The PR has an on-board electromagnetic energy convertor.

In accordance with the teachings of the present disclosure, as illustrated in FIGS. 1A-1B, a power delivery system 10 is provided according to some embodiments. Power delivery system 10 can comprise a deployable MPT 100 and a PR 102. As will be discussed herein, deployable MPT 100 can be translationally displaceable (i.e., FIGS. 1A-1B) or rotationally or pivotally moveable (i.e., FIG. 10).

Figure 2:
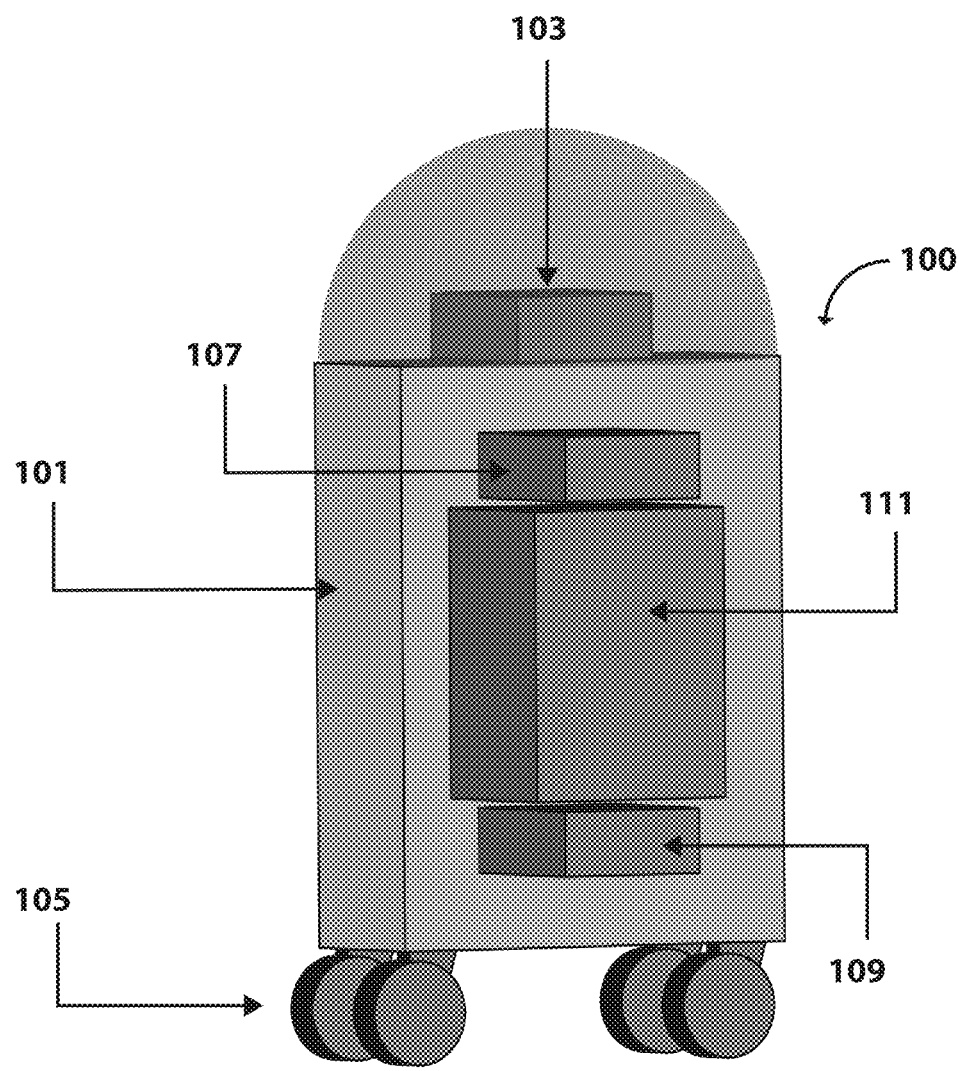
FIG. 2 is a schematic view illustrating a deployable MPT according to the present teachings.

In some embodiments, as illustrated in at least FIG. 2, MPT 100 can comprise a support casing 101, a control system 103, a drive system 105, a communication system 107, a power source system 109, and a charging system 111. In some embodiments, the support casing 101 is an open platform wherein components of the MPT 100 are exposed. In some embodiments, the support casing 101, at least partially, covers components of the MPT 100. In some embodiments, the support casing 101 may remain afloat. In some embodiments, the support casing 101 may provide safety features to avoid and/or minimize accidental impact, such as head lights, turn signals, airbags, and fender. In some embodiments, the support casing 101 can attach to a PR 102. In some embodiments, the support casing 101 can attach to a PR 102 via a physical connector such as hooks, suction cups, chain, pull cable, magnetic connectors, etc. while charging PR 102. In some embodiments, the support casing 101 can attach to PR 102 and detach after charging. In some embodiments, the support casing 101 is constrained by a track, whereby the track is configured to limit motion of MPT 100 along a predetermined charging service route.

In some embodiments, control system 103 includes sensors, such as remote sensing methods, to monitor environmental conditions. In some embodiments, control system 103 comprises cameras. In some embodiments, control system 103 comprises a global positioning system (GPS) unit. In some embodiments, control system 103 comprises a communication system 107. In some embodiments, control system 103 comprises a data acquisition unit. In some embodiments, control system 103 comprises a data storage unit. In some embodiments, control system 103 comprises a processing unit. In some embodiments, control system 103 can retrieve identification information of PR 102 from a database of identification information of a plurality of power receivers. In some embodiments, control system 103 can search for PR 102. In some embodiments, control system 103 comprises sensors to monitor and process the properties of incoming electromagnetic power for charging and/or communication. In some embodiments, MPT 100 comprises a control system 103 comprising a sensor to monitor status selected from a group of location, environmental conditions, obstacles, traffic signs, sounds, warnings, traffic conditions, proximity to objects, safety features, charge condition, cellular network condition, drive conditions, spatial conditions, radio interference, traffic control updates, road conditions, weather condition, space weather condition, water condition, space debris condition, pressure condition, lighting condition, slope condition, power condition, fuel condition, or a combination thereof. In some embodiments, MPT 100 comprises a control system 103 comprising a sensor selected from a group of remote sensing sensors, such as light and radar (lidar) sensors, photodiodes, such as infrared, photo, and photomultiplier tube sensors, cameras, such as infrared and charge-coupled device cameras, the global positioning system (GPS), orientation sensors, gyroscopes, star trackers, magnetometers, accelerometers, proximity sensors, barcode readers, inclinometers, limit switches, ultrasonic sensors, sonic sensors, piezoelectric sensors, liquid sensors, pressure sensors, or a combination thereof.

In some embodiments, drive system 105 provides a form of propulsion. The form of propulsion may include an engine, a motor, wheels, reaction wheel, levitation coil, rotors, etc. In some embodiments, drive system 105 comprises a suspension unit. In some embodiments, the reaction wheel can be used for attitude control. In some embodiments, the drive system 105 is selected from a group of motor, wheel, tire, pull cable, suspension unit, gearbox, axle, brake, steering wheel, engine, rotor, magnetic levitation, coil, wing, propeller, turbine, paddles, sail, fins, legs, arms, limbs, impeller, rocket, thruster, propulsive nozzle, fly wheel, reaction wheel for attitude control, sled, sledge, rail, track, or a combination thereof. In some embodiments, the drive system 105 is constrained by a track, whereby the track is configured to limit motion of MPT 100 along a predetermined charging service route. For instance, tram-like tracks can be used in urban areas or in parking structures to limit motion of MPT 100 by reducing translational and/or rotational degrees of freedom.

In some embodiments, communication system 107 comprises a wireless data communication system. In some embodiments, communication system 107 is voice activated. In some embodiments, communication system 107 can communicate with a PR 102 or a user preparing to charge via sound. In some embodiments, communication system 107 can communicate with a PR 102 or a user preparing to charge via an interface, such as an interactive display. In some embodiments, communication system 107 communicates a charging service schedule, wherein the charging service schedule comprises at least of scheduled charging allocations and location. In some embodiments, communication system 107 communicates that MPT 100 is available to provide charging. In some embodiments, communication system 107 requests a charging permission from an MPT management system. In some embodiments, communication system 107 can search for PR 102. In some embodiments, communication system 107 can search for PR 102 from a database of charging service requests. In some embodiments, communication system 107 communicates with PR 102 directly or via a web-based application, i.e., the cloud 114. In some embodiments, communication system 107 communicates with a user preparing to charge a PR 102 directly, e.g., via phone or Bluetooth, or via a web-based application, i.e., the cloud 114. In some embodiments, communication system 107 communicates with a traffic management system, such as a police department, to provide traffic updates including accidents. In some embodiments, communication system 107 reports a hazardous condition to a safety management system, such as a fire department, including reporting a fire. In some embodiments, communication system 107 communicates with and provides updates to a traffic management system, such as an air control office. In some embodiments, communication system 107 communicates with a traffic management system and waits for a response, the response including permission to operate, weight limits, charging restrictions, safety requirements to operate, etc. In some embodiments, communication system 107 of a first MPT 100 communicates with a communication system 107 of a second MPT 100. In some embodiments, communication system 107 of a first MPT 100 communicates with other vehicles. In some embodiments, communication system 107 of a first MPT 100 can be contacted by other communication systems. A web-based application is envisioned that can, from many of its capabilities, process charging service requests of a plurality of power receivers and to connect a power receiver to a qualified MPT or a MPT fleet management system, the MPT fleet management system managing a plurality of MPTs. The web-based application can schedule charging service sessions for a plurality of PR's 102 and communicate the schedule with one or more PR's 102 and the qualified MPT or the MPT fleet management system.

In some embodiments, power source system 109 comprises a power storage unit, such as a fuel cell, capacitors, etc. Examples of fuel cells include electrochemical cells, such as batteries and hydrogen fuel cells. The power storage unit may store power in the form of electrical charge. In some embodiments, power source system 109 comprises a power generator unit. In some embodiments, the power generator unit of the power source system 109 converts mechanical energy from fuels such as gasoline, diesel, natural gas, biofuel, etc. into electrical power for charging. In some embodiments, the power generator unit of the power source system 109 is driven by a turbine which converts mechanical energy from wind, steam, water, etc. into electrical power for charging. In some embodiments, power source system 109 receives power from an electrical outlet or a power network. In some embodiments, an operator preparing to charge a PR 102 plugs in an electrical cable of the power source system 109 to an electrical outlet. In some embodiments, power source system 109 receives power from a power network such as a tram-like power distribution line. In some embodiments, power source system 109 comprises a power convertor unit configured to convert one type of power to an applicable type of power that can be transmitted to PR 102. Examples of a power convertor include solar panels, etc. In some embodiments, power source system 109 comprises a power transmitter unit, such as a source of condensed electromagnetic power. In some embodiments, power source system 109 is connected to a power line such as a power outlet. In some embodiments, power source system 109 receives power from a power transmitter. In some embodiments, power source system 109 receives power from an MPT.

In some embodiments, the charging system 111 comprises a charging cable. In some embodiments, the charging system 111 comprises a charging pad to provide wireless charging. In some embodiments, the charging system 111 comprises a source of electromagnetic power and an optical system configured to guide and/or manipulate at least one characteristic of an electromagnetic power, such as light, the at least one characteristic of an electromagnetic power selected from a group of frequency, intensity, propagation direction, wave mode, and polarization. In some embodiments, the charging system 111 comprises electromagnetic power guides such as optical lenses, mirrors, etc. In some embodiments, the charging system 111 comprises at least one reflective surface such as a mirror to guide electromagnetic energy toward PR 102. In some embodiments, the charging system 111 comprises a waveguide, such as a fiber optic. In some embodiments, the charging system 111 is controlled by the control system 103. In some embodiments, the charging system 111 is fully automatic. In some embodiments, the charging system 111 is coupled to a power receiver by an operator. In some embodiments, the charging system 111 is operably coupled to the drive system 105, wherein the drive system provides at least one rotational degree of freedom.

In some embodiments, as illustrated in FIGS. 1A-4, power delivery system 10 is provided wherein deployable MPT 100 is configured to relocate to PR 102 at a location of PR 102. In one embodiment, drive system 105 of MPT 100 is a plurality of wheels 113 (see FIG. 1A). In another embodiment, drive system 105 comprises rotors 115 (see FIG. 1B). MPT 100 can communicate 110 wirelessly (e.g., via a web-based application shown as a computing cloud, 114) or via wired connection (e.g. directly via cable or the like) with an on-board control system 106 of PR 102. In some embodiments, PR 102 carries on-board power storage or convertor units 104 that are connected via line 108 or otherwise operably coupled with on-board control system 106. In some embodiments, MPT 100 is equipped with a communication system 107 that can locate PR 102. In some embodiments, MPT 100 comprises a control system 103 that can track a mobile PR 102. In some embodiments, the mobile PR 102 is an air taxi. In some embodiments, support casing 101 of MPT 100 can attach to PR 102 via physical connectors 128 (see FIG. 4) to transmit power to PR 102.

Figure 3:
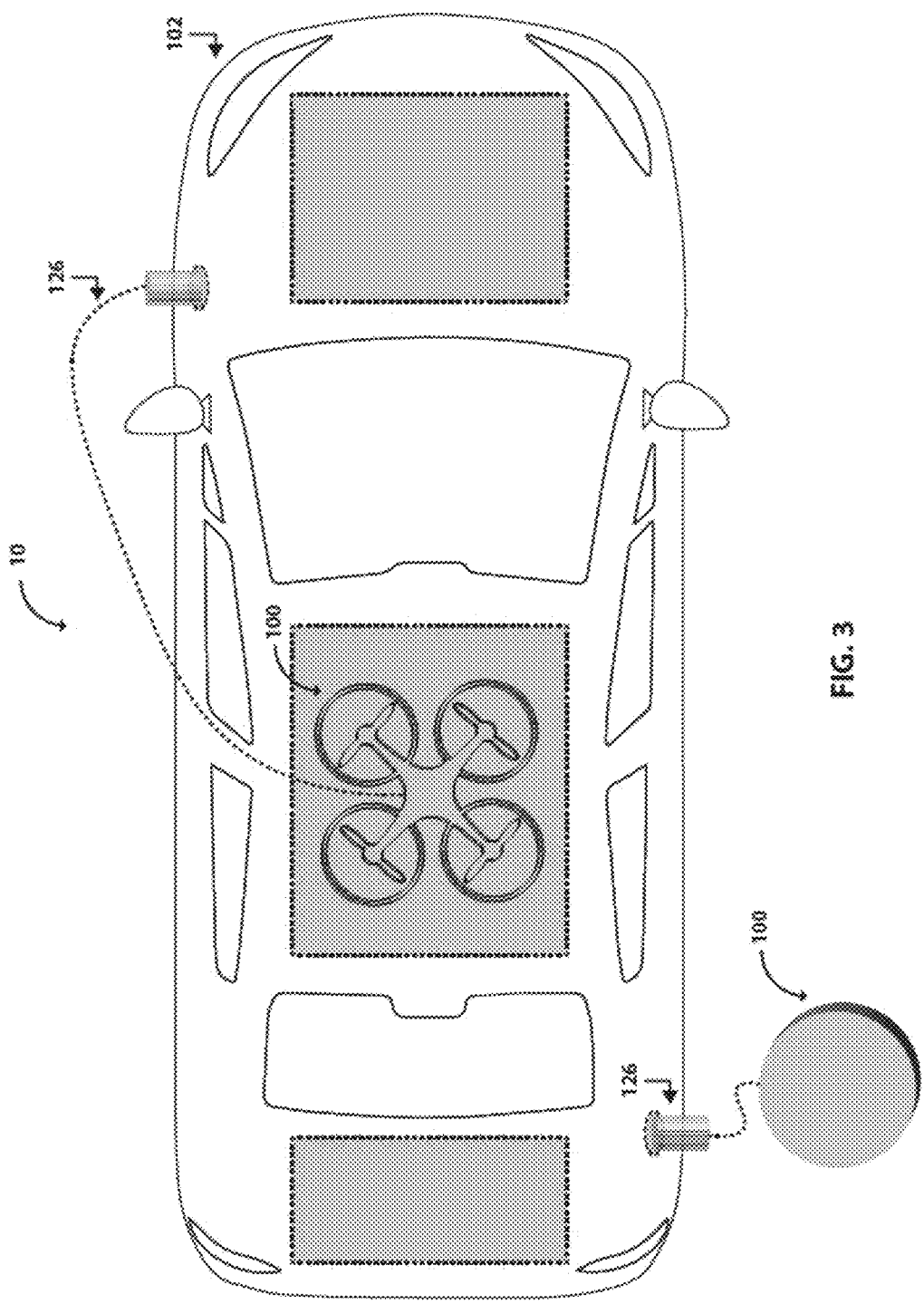
FIG. 3 illustrates a schematic view illustrating a configuration wherein a deployable MPT is capable of communicating (via the cloud or directly) with the PR's on-board control system. The MPT can charge the PR wirelessly or via cable.

With continued reference to FIG. 1A, in some embodiments, MPT 100 can be a movable member disposed below PR 102, such as a vehicle. However, in some embodiments as illustrated in FIG. 1B, MPT 100 can be a movable airborne device, such as a UAV, disposed above or around PR 102. In accordance with some embodiments, the associated power storage 104 and/or onboard control system 106 can be positioned on PR 102 in a position conducive to receive communication and/or power transmission from MPT 100 and/or cloud 114. As illustrated in FIG. 3, in some embodiments, MPT 100 is configured to communicate and/or transmit power to PR 102 via a cable 126.

In some embodiments, as illustrated in FIG. 4, MPT 100 can attach at 128 to PR 102 via physical connectors—in this particular embodiment using magnetic forces 128—while charging to enable continuous operation of PR 102.

FIG. 5 is a schematic view illustrating a configuration wherein a deployable MPT 100, a UAV, is capable of communicating 110 (via the cloud 114 or directly 136) with on-board control system 106 of PR 102. MPT 100 can be a UAV with a landing platform 140 over which PR 102 can land to charge. PR 102 may remain attached to MPT 100 via physical connectors while charging. In some embodiments, PR 102 may detach and take off after charging. PR 102 may land on or attach to MPT 100 while charging via contact or non-contact methods (i.e. wireless) of charging. PR 102 may carry an on-board power storage and/or convertor unit 117. This capability will allow continuous operation.

FIG. 6 is a schematic view illustrating a configuration wherein a deployable MPT 100, a UAV, is capable of communicating 110 (via the cloud 114 or directly) with on-board control system 106 of PR 102. MPT 100 can track and charge at 152 PR 102 wirelessly via transmitting electromagnetic power while PR 102 continues operation. This operation can be done manually by an Operator-In-The-Loop 154, semi-automatically, or fully autonomously without any human intervention. PR 102 may carry one (or more) on-board power storage 104 and/or convertor units 117.

FIG. 7 is a schematic view illustrating a configuration wherein MPT 100 is capable of identifying PR 102. In some embodiments, MPT 100 identifies PR 102 based on transmitted identifying information. In some embodiments, MPT 100 identifies PR 102 from identification information retrieved from a database. In some embodiments, MPT 100 identifies PR 102 based on identifying information, such as a barcode, collected from the body of PR 102. In some embodiments, MPT 100 can move via magnetic levitation 119. In some embodiments, MPT 100 moves with and can attach to a mobile PR 102 to charge. In some embodiments, MPT 100 communicates with and/or transmits power to PR 102 wirelessly. In some embodiments, MPT 100 is constrained to only move along a predetermined charging service route or track 164. Advantages of constraining the motion of MPT 100 along a predetermined charging service route include improved device traffic management, reduced scheduling complexity, as well as increased safety. MPT 100 may carry an on-board power storage unit or it may be attached to the positive and negative poles installed along track 164. MPT 100 may also carry a power convertor unit on-board, such as a solar panel, that charges MPT's on-board power storage unit.

FIG. 8 is a schematic view illustrating a configuration wherein an MPT 100 is installed indoor 170, in this case in a parking structure, and is capable of communicating 110 (via the cloud 172 or directly) with on-board control system 106 of PR 102. MPT 100 may be constrained to only move along one or more predetermined and discrete charging service routes, i.e., such as tracks 164 assigned to individual parking spots 121. In some embodiments, MPT 100 receives a charging service request from PR 102 via the cloud 114 or a parking vending machine. The charging request comprising a parking spot number to which MPT 100 relocates to charge a corresponding PR 102. MPT 100 may extend downward 123 to transmit power to PR 102. The charging service may be requested by a member user.

FIG. 9 is a schematic view illustrating a configuration wherein MPT 100 is installed indoor 170, in this case in a parking structure, and is capable of communicating 110 (via the cloud 114 or directly) with on-board control system 106 of PR 102. MPT 100 is constrained to only move along tracks 164, installed under 190 or above floor surface. MPT 100 may emerge from under the floor surface to provide charge or may remain under the floor surface and provide charge via non-contact methods of charging.

Methods for searching for, identifying, scheduling a charging session, and tracking of an MPT 100 are further provided. In some embodiments, an intelligent charging service system is identified as having an intelligent automatic management system. In some embodiments, intelligent charging service provides automation functions such as inquiring, broadcasting positioning, tracking, recording, searching, confirming, charging, receipt printing, navigating, real-time traffic information, security, emergency help requesting and communication, so as to achieve a total service system with efficacy of high security, high reliability, and time saving. In some embodiments, intelligent charging service system provides charging characteristics of an MPT 100. In some embodiments, the intelligent charging service system provides information regarding an MPT's source of power, information such as the percentage of the MPT's power generated by renewable sources of energy. In some embodiments, the intelligent charging service system provides information regarding carbon footprint of an MPT 100. In some embodiments, the intelligent charging service system provides information regarding the performance of an MPT, including reviews.

In some embodiments, a PR 102 or a user preparing to charge a PR 102 searches for a compatible MPT 100. In some embodiments, a charging service is scheduled based on the charging request from a PR 102. In some embodiments, a PR 102 is a member user. In some embodiments, a method for scheduling a charging session for a PR 102, the method comprising:

a. receiving charging request from a PR 102, the charging request comprising a date, time, location, and information regarding charging characteristics of the PR 102;

b. scheduling a charging session that corresponds to the received charging request; and c. transmitting, to the MPT 100 and the PR 102, instructions regarding the scheduled charging session.

In some embodiments, an MPT 100 is identified automatically to deliver power to a PR 102 or a user preparing to charge. A computer-implemented method for matching a PR 102 with an MPT 100 for a charging service, comprising:

a. receiving charging capability information about a plurality of MPTs;

b. receiving a plurality of charging characteristic information from the PR 102;

c. receiving a request for the charging service from the PR 102;

d. automatically identifying one of the MPTs as a candidate MPT 100 for the charging service based on the charging characteristic information and the charging capability information responsive to the received request; and e. providing charging instructions to the PR 102 and the identified candidate MPT 100 to match the PR 102 with the identified candidate MPT 100.

In some embodiments, the MPT 100 is of an MPT management system. In an MPT management system comprising at least one computer associated with said facility and at least one MPT 100 with compatible charging accommodations for a PR 102 and equipped with safety procedures and control, drive, communication, power source, and charging systems to deliver power to a PR according to a PR-request to charge at a location, said MPT management system and MPT with improved operational and safety features being comprised of:

a. a PR-request received by the computer for the PR 102, b. information sent by the computer to the PR 102 comprising charging instructions and the PR 102 proceeds to a charging zone according to the charging instructions, c. instructions sent from the computer to the communication system 107 of the MPT 100 to send the MPT 100 to the charging zone according to instructions, d. the MPT arriving at the charging zone and proceeding to charge the PR 102, e. the computer confirming from the MPT communication system 107 that the MPT 100 proceeding to charge the PR 102 is in compliance with instructions and safety procedures, f. the computer validates charging information according to the instructions, g. computer instructing the MPT 100 to initiate charging, and h. the MPT 100 informs the computer of its safe and complete charging according to the instructions.

In some embodiments, power delivery is provided by an MPT 100 serving the charging needs of a group of PRs on a regular basis. In some embodiments, a method to service the local charging service needs of PRs using web-based data entries and integrated geographic systems to group similar PR 102 charging requirements, said method comprising the following steps:

a. receiving from a PR 102 directly into a first database charging characteristics information, if applicable, billing data, said PR's anticipated regular and occasional charging requests for a known period of time, said charging requests consisting of date, desired charging time, desired charging location, frequency, and charging characteristics of said PR 102 having specific charging restrictions;

b. itemizing and merging all trip requests for all PRs by date, desired charging time, and desired charging location;

c. organizing said merged charging requests into subgroups of similar individual charging requests at least weekly;

d. verifying with each PR 102 charging requests for a month to insure that all charging requested are serviced correctly;

e. identifying an MPT 100 for the charging service based on the organized charging requests;

f. notifying each PR the MPT 100 identity and time of each charging session and allocated charging for each date charging service will be delivered.

FIG. 11 is a flow chart of an exemplary algorithm through which PR 102 or a user preparing to charge a PR 102 requests a charge at step 192 (via mobile application, website, on-board communication system, etc.) from a local charging service provider in step 194 and receives charging without the need to go to a charging service provider, an MPT 100. MPT 100 is a deployable charging system. In some embodiments, MPT 100 tracks PR 102 at step 198 with the use of Global Positioning System (GPS) 196. MPT 100 proceeds to charge PR 102 wirelessly or via a physical connector. The charging can be done while PR 102 is still in operation without interruption.

FIG. 12 is a flow chart of an exemplary algorithm through which charging status of PR 102 is assessed continuously 200. In some embodiments, the PR 102 is of a PR management system, wherein the PR management system comprising a plurality of PRs having charging characteristics, locations, schedules, etc. In some embodiments, the continuous charging status is assessed by a PR management system. A request for charging 202 is generated when the PR needs charging. Based on the information provided in the charging request, a compatible 204 MPT 100 from a charging service management is identified, informed in step 202, and deployed to charge the PR 102. In some embodiments, the PR 102 may be provided information in step 206 regarding a plurality of MPT fleet management services to choose from. In some embodiments, the PR 102 may be provided information 206 comprising a schedule regarding the time and the amount of allocated charge determined based on the generated charging request.

FIG. 13 is a flow chart of an exemplary algorithm through which charging status of a PR 102 is assessed continuously in step 208. A request for charging 210 is automatically generated when the PR 102 needs charging. The PR 102, in this case, is already a member of a fleet management service providing charging service to a plurality of known PRs. The PR 102 may by stationary and may have an on-board power convertor. The MPT 100 is informed of the charging service in step 201 may move to the PR 102 requesting for a charge by rotating toward it in step 212.

In some embodiments, the MPT 100 is operated by an operator on site. In some embodiments, an MPT 100 needs plugging into an outlet while preparing to charge. In some embodiments, the MPT 100 is operated by a user who requested charging for a PR 102. In some embodiments, an operator manually charges a PR 102 using the charging system 111 of MPT 100. In some embodiments, the MPT 100 is constrained to only along a predetermined charging route such as a tram-like track which simplifies charging by eliminating at least one translational degree of freedom. In some embodiments, MPT 100 arrives at a charging zone based on charging instructions shared by a computer of an MPT management system or processed locally by the MPT's processing unit of the control system 103, and proceeds to automatically charge a PR 102. In some embodiments, a charge sequence method for charging a PR 102 with a first MPT 100, the method comprising:
　a. retrieving identification information of the PR 102 from a database containing identification information of a plurality of PRs, the identification information containing information regarding at least one charging characteristic of the PR;
　b. determining an appropriate position and orientation of the first MPT 100 relative to the PR 102, based on the identification information; and
　c. collecting time-stamped surveying information; the time-stamped surveying information comprising a position and an orientation of the first MPT 100 relative to the PR 102 while the first MPT 100 adjusts and updates its time-stamped surveying information;
　wherein accomplishing the appropriate position and orientation relative to the PR 102 by the first MPT 100 through iteratively adjusting its position and orientation relative to the PR 102 causes the MPT 100 to proceed a charging process.

In some embodiments, the charging process involves continuous monitoring of the amount of charge delivered relative to the allocated charge based on the instruction processed by MPT 100 control system 103. In some embodiments, a method of charging a PR 102 of a plurality of PRs comprising an electromagnetic power convertor and a power storage unit by a first MPT 100, wherein power characteristic varies with the state of charge of the power storage unit on-board the PR and in which the power characteristic varies with time during charging until attaining substantial full charge, the method comprising:
　a. retrieving identification information of the PR from a database containing identification information of a plurality of PRs, the identification information containing information regarding at least one charging characteristic of the PR;
　b. monitoring time-stamped surveying information; the time-stamped surveying information comprising a position and an orientation of the MPT 100 relative to the PR 102 while the first MPT 100 adjusts and updates its time-stamped surveying information;
　c. determining an allocation amount and provision time of electromagnetic power to the PR 102;
　d. providing electromagnetic power to charge the power consumer based on the determined allocation amount and provision time;
　e. collecting time-stamped status information from at least one electromagnetic sensor on-board the PR 102, the electromagnetic sensor configured to monitor at least one characteristic of the provided electromagnetic power; and
　f. monitoring the power characteristic of the power storage unit on-board the power consumer and the collected time-stamped status information from the at least one electromagnetic sensor on-board the PR 102 periodically during charging.

In some embodiments, both the MPT 100 and PR 102 are mobile and the power delivery is performed while the PR 102 continues operation. In some embodiments, a method of charging in a two mobile rigid-body system comprising an MPT 100 and a mobile PR, for instance an air taxi in operation, etc., the mobile PR 102 comprising an electromagnetic power convertor and a power storage unit, wherein power characteristic varies with the state of charge of the power storage unit on-board the mobile PR 102 and in which the power characteristic varies with time during charging until attaining substantial full charge, the method comprising:
　a. determining an appropriate position and orientation of the MPT 100 relative to the mobile PR 102;
　b. monitoring first time-stamped surveying information; the first time-stamped surveying information comprising a position and an orientation of the MPT relative to the mobile PR 102;
　c. transmitting, to the MPT 100, the determined appropriate position and orientation of the MPT 100 relative to the mobile PR 102;
　d. monitoring second time-stamped surveying information; the second time-stamped surveying information comprising a position and an orientation of the mobile PR 102 relative to the MPT 100;
　e. determining an allocation amount and provision time of electromagnetic power to the mobile PR 102;
　f. providing electromagnetic power to charge the mobile PR 102 based on the determined allocation amount and provision time;
　g. collecting time-stamped status information from at least one electromagnetic sensor on-board the mobile PR 102, the electromagnetic sensor configured to monitor at least one characteristic of the provided electromagnetic power; and
　h. monitoring the power characteristic of the power storage unit on-board the mobile PR 102 and the collected time-stamped status information from the at least one electromagnetic sensor on-board the mobile PR 102 periodically during charging;
　wherein at least one body of the two mobile rigid-body system adjusts and updates its time-stamped surveying information based on the determined appropriate position and orientation.

In accordance with the present teachings, the present disclosure also provides systems and methods for charging power receivers (PRs) 304, including plug-in electric vehicles (PEVs) 350, via a decentralized charging network of mobile power transmitters (MPTs) 300. As illustrated in FIG. 14, for example, a decentralized charging network of MPTs 300 comprises a server 302 and, in some embodiments, a plurality of MPTs 306. In some embodiments, the server 302 is a web-based MPT management system administering the charging service operations of a plurality of MPTs 306. In some embodiments, the server 302 is a computer. In some embodiments, the server 302 is accessed via phone, radio, cell network, electronic text message, and the like.

The server 302 can further manage and report charging transactions to private and public entities. In some embodiments, the server 302 reports to oversight authorities 320 including the transportation and energy departments. The server 302 can also communicate with safety authorities 322 to ensure a safe and secure power delivery. The server 302 can further contact financial entities 324 in order to process a payment and/or report a PR history of charging using carbon-free sources for qualifying tax-exemption purposes. In yet other embodiments, a server 302 can communicate with power distributors 326 to ensure a steady and smart use of power. In some embodiments, an MPT 306 may choose to plug in to an on-sight power outlet for recharging depending on the time of the day, etc. In other embodiments, a server 302 provides information to an MPT 306 regarding recharging schedule of a power producer such as a solar farm. In some embodiments, the server 302 communicates with a power management system to schedule an upcoming MPT recharging session. In some embodiments, a server 302 may contact a property management 328 and process information regarding parking permits, parking violations, on-site safety features, on-site power accessibility, etc.

In some embodiments, the server 302 has access to a PR database 330 or user dataset containing identification information of a plurality of PEVs 350 and charging information of a plurality of MPTs 306. In some embodiments, the PEV identification information contains membership information and charging characteristics. In some embodiments, the membership information comprises account number, payment information, vehicle information, personal information, employment information, environmental preferences, carbon footprint information, place of residence, place of employment, demographic information, loyalty program information, background information, charge history information, history of PEV ownership information, driving history information, insurance information, social or financial credit information, reviews, desired charging locations, desired charging times, and PEV access instructions including safety and security information. In some embodiments, the charging characteristics include maximum current, maximum voltage, recommended charging duration, and charging type such as contact and/or non-contact charging characteristics. In some embodiments, the charging is requested and/or performed by an operator 352. In some embodiments, the PEV 350 automatically requests a charging. In some embodiments, the PEV charging is recurrent.

In some embodiments, the server 302 has access to an MPT database 332 and/or provider dataset containing charging information of a plurality of MPTs 306. In some embodiments, the MPT 306 charging information contains onboard charging system information 314 and charging schedule. In some embodiments, the MPT 306 onboard charging system 314 information includes onboard receptacle type(s), adaptor, available charge, operational current and voltage characteristics, percentage of charge from renewable sources, and onboard safety and security capabilities. In some embodiments, the charging schedule contains information such as radius of operation, operational dates and hours, available charging times, reserved charging locations, reserved charging times, and reserved charging durations. In some embodiments, the MPT 306 charging information contains information regarding the MPT 306 self-charging such as self-charging time, duration, location, etc. In some embodiments, charging information comprises reviews, insurance provider, service history, demographic information, loyalty program information, driving history, and carbon footprint.

In some embodiments, the MPT 306 comprises a control system 310, a power source system 312, a charging system 314, and a communication system 316. The control system 310 is the central processing unit and controls the charging operations of the MPT 306. In some embodiments, the control system 310 contains a central processing unit (CPU). In some embodiments, the control system 310 includes a graphical processing unit (GPU) and can monitor, and, in some embodiments, record processes in an on-board memory unit. In some embodiments, the control system 310 includes sensors such as the global positioning system (GPS) to indicate the location of the MPT. The control system is an essential component of an MPT 306 controlling the operations of the power source system 312, the charging system 314, and the communication system 316.

In some embodiments, the power source system 312 includes a power storage unit selected from a list of battery 340, rechargeable battery, capacitor, supercapacitor, flywheel, and fuel cell. In some embodiments, the power source system 312 converts energy from one energy form to another. In some embodiments, the power source system 312 includes an inverter which converts direct current (DC) to alternating current (AC) or vice versa. In some embodiments, the power source system 312 includes a charge measuring device 142 to control and, in some cases, record the transfer of charge.

In some embodiments, the charging system 314 includes a cord and a connector to transfer charge from the power source system 312 to the PEV 350. In some embodiments, the charging system 314 includes plugging connectors that are compatible with either the Level 1, Level 2, and/or DC fast-charging charging receptacles. In some embodiments, the charging system is a non-contact charging system such as a charging pad and electromagnetic radiation source for power beaming. The U.S. Ser. No. 18/049,880 provides an electromagnetic power convertor device that converts electromagnetic radiation into electricity.

The communication system 316 is configured for communication between a server 302, PR 304, and MPT 306. In some embodiments, the communication system 316 contains a display to provide real-time charging transfer information such as electric current, voltage, charging duration, and time until completion. In some embodiments, the communication system 316 is selected from a list of display, keypad, voice-activated interface, interactive interface, microphone, speaker, optical communication system, barcode reader, chip reader, communication sensor (e.g., radio frequency identification (RFID)), modem and wireless communication system, local area network (LAN) communication system, Bluetooth® communication system, wireless personal area network (WPAN) communication system, near-field communication (NFC) system, ZigBee® communication system, wireless local area network (WLAN) communication system, radio communication system, microwave communication system, power line communication (PLC) system, broadcast messaging system, cellular communication system, such as cellular robotic system and cell phone service, and wide area network (WAN) communication system, such as the Internet to access the Web.

As illustrated in FIG. 15, in some embodiments, the decentralized charging network of MPTs 300 involves a server 302, such as MPT management personnel 334, instructing an MPT 306 to drive to a PR 304 requesting a charge. The instructions and the charging session updates are communicated 360 between the server 302 and the MPT 306. The instructions sent to the MPT includes information regarding the PR charging receptacle type. According to the instructions, the MPT provides a compatible charging device from the charging system 314 to charge the PR 304. The PR operator can receive more information about the charging session and interact with the MPT's communication system 316 via an interactive display and keypad.

As illustrated in FIG. 16, in some embodiments, the decentralized charging network of MPTs 300 is a charge delivery system 370. The charge delivery system 370 delivers a charging station 372 to a location of a PR 304, e.g., a PEV 350. In some embodiments, an operator 352 preparing to charge a PEV 350 requests and receives an MPT, a charging station 372, at their desired charging time and location. The charging request is processed by a server 302, such as MPT management personnel 334 with access to computers and databases 330 and 332, and sent to an MPT, a charge delivery system 370. The charge delivery system 370 is operated by a technician and/or a driver 374. The charge completion is communicated with the server 302 by the communication system 316 of the charging station 372. In some embodiments, the MPT is returned to the MPT management system. In some embodiments, the MPT is disposable. In some embodiments, the MPT can be recharged. In some embodiments, the MPT is picked up after the charging is completed. In some embodiments, the MPT pick up is scheduled. In some embodiments, the charging station travels with the PEV. In some embodiments, the MPT can charge a PEV while in operation.

In some embodiments, such as illustrated in FIG. 17, the MPT 306 is an unmanned aerial vehicle (UAV) 376 delivering a charging station 372 to a PR 304 preparing to charge. In other embodiments, the MPT 306 can deliver power via land, sea, air, and/or space. In yet other embodiments, PR 304 can be a PEV, scooter, sea transportation systems such as boats and submarines, aerial vehicles such as UAVs and air taxis, space-borne vehicles such as a robot, or underground vehicles such as mining systems.

In some embodiments, an MPT 306 arrives at a location of a PEV 350 requesting charging based on charging instructions generated by a server 302. The MPT 306, a charging station 372, is positioned in close proximity to the PEV 350 such that a cable of the MPT charging system 314 can reach the PEV 350 charging receptacle. The MPT communication system 316 and the control system 310 confirm the initiation of a charging session and, therefore, the charging is activated. The real-time charging information is provided by the MPT communication system 316. Meanwhile, the control system 310 ensures the safety of the operations. The charge measuring device 342 of the power source system 312 monitors the charging and provides real-time charging information to the control system 310. Once charging is completed, the control system 310, the communication system 316, and the power source system 312 deactivate the charging and communicate 360 the charging completion. The charging system 314 is then disengaged.

A decentralized charging network of MPTs is managed by a server 302 with access to PR 304 and MPT 306 information. Upon receiving a charging request from a PR 304, an operator 352 preparing to charge, and/or a recurring charging request, the server 302 identifies an MPT 306. The MPT identification can depend on the MPT compatibility, charging capability, and/or availability. The identified MPT then arrives at the location of the charge-requesting PR 304 based on the charging instructions generated by the server 302. Upon arriving, the PR 304 and MPT 306 confirm the charging instructions. The charging is then started. The charging is monitored in real-time. Upon completion, the charging is deactivated and the charging operation is confirmed finished.

In some embodiments there is provided a method of transferring charge between a mobile power transmitter having an onboard power source system 312 and a power receiver, comprising:

maintaining by a server 302 a user dataset 330 containing identification information of a plurality of member power receivers, the identification information containing membership information and charging characteristics of power receivers;

maintaining by a server 302 a provider dataset 332 containing charging information of a plurality of mobile power transmitters, the charging information containing onboard charging system 314 information and charging schedule;

receiving by the server 302 a charging request from an operator of a power receiver from the user dataset 330, the charging request is generated by a communication system of the operator of the power receiver, the charging request containing at least a desired charging time interval and a desired charging location;

identifying by the server 302 a mobile power transmitter from the provider dataset 332, the identification is made based on the received charging request and the charging information of the mobile power transmitter;

sending by the server 302 to a communication system of the identified mobile power transmitter a first charging instructions, the first charging instructions containing information about the charge requesting power receiver, a scheduled charging time, and charging location and waiting for a confirmation;

contacting by the server 302 the operator of the power receiver with a second charging instructions after receiving the confirmation, the second charging instructions containing information about the identified mobile power transmitter, a scheduled charging time and charging location;

the mobile power transmitter arriving at the scheduled charging time to the scheduled charging location based on the first charging instructions, the arrival is verified by the server 302;

on server verification, providing a charging system 314 for transferring charge, wherein the charging system 314 is supported by the onboard power source system 312 of the mobile power transmitter, the onboard power source system 312 being controlled by an onboard control system 310;

proceeding to transfer charge to the power receiver from the power source system 312 of the mobile power transmitter via the charging system 314, the charge transfer being communicated to the communication system of the operator of the power receiver by the communication system of the mobile power transmitter, the charge transfer being activated by the control system 310 of the mobile power transmitter;

monitoring the charge transfer by a charge measuring device of the charge source system of the mobile power transmitter, the charge measuring device is connected to the onboard control system 310, the onboard control system 310 configured to monitor the output of the charge measuring device, maintain running total of charge transferred, and detect the completion of the charge transfer; and on detecting completion, disabling charge transfer and communicating the completion of charge transfer to the server 302 and to the communication system of the operator of the power consumer.

In some embodiments, the PR 304 comprises an on-board communication system capable of directly contacting a server 302 to request a charging. A method of transferring charge between a mobile power transmitter having an onboard power source system 312 and a power receiver, comprising:

maintaining by a server 302 a user dataset 330 containing identification information of a plurality of member power receivers, the identification information containing membership information and charging characteristics of power receivers;

maintaining by a server 302 a provider dataset 332 containing charging information of a plurality of mobile power transmitters, the charging information containing onboard charging system information and charging schedule;

receiving by the server 302 a charging request from a power receiver from the user dataset 330, the charging request is generated by a mobile wireless communication system onboard the power consumer, the charging request containing at least a desired charging time interval and a desired charging location;

identifying by the server 302 a mobile power transmitter from the provider dataset 332, the identification is made based on the received charging request and the charging information of the mobile power transmitter;

sending by the server 302 to a communication system of the identified mobile power transmitter a first charging instructions, the first charging instructions containing information about the charge requesting power receiver, a scheduled charging time, and charging location and waiting for a confirmation;

contacting by the server 302 the power receiver with a second charging instructions after receiving the confirmation, the second charging instructions containing information about the identified mobile power transmitter, a scheduled charging time and charging location;

the mobile power transmitter arriving at the scheduled charging time to the scheduled charging location based on the first charging instructions, the arrival is verified by the server 302;

on server verification, providing a charging system 314 for transferring charge, wherein the charging system 314 is supported by the onboard power source system 312 of the mobile power transmitter, the onboard power source system 312 being controlled by an onboard control system 310;

proceeding to transfer charge to the power receiver from the power source system 312 of the mobile power transmitter via the charging system 314, the charge transfer being communicated to the mobile wireless communication system of the power receiver by the communication system of the mobile power transmitter, the charge transfer being activated by the control system 310 of the mobile power transmitter;

monitoring the charge transfer by a charge measuring device of the charge source system of the mobile power transmitter, the charge measuring device is connected to the onboard control system 310, the onboard control system 310 configured to monitor the output of the charge measuring device, maintain running total of charge transferred, and detect the completion of the charge transfer; and upon detecting completion, disabling charge transfer and communicating the completion of charge transfer to the server 302 and to the mobile wireless communication system of the power consumer.

A decentralized charging network offers a plurality of charging nodes, therefore enabling an on-demand electric charge service, wherein 1) a plurality of MPTs 306 strive to transfer charge to a compatible plurality of PRs 304, and/or 2) a plurality of MPTs 306 and PRs 304 subscribe to become nodes of a peer-to-peer charge service, such as in a hub-spoke network configuration or nodes-only network blockchain configuration. The key distinguishing value proposition of a peer-to-peer on-demand electric charge service is that the charging nodes cluster around active service areas. Active service area can be defined as areas with increased traffic, such as the business district during business hours and social districts after hours.

An On-Demand Electric Charge Service:

A system for establishing a charge session in an on-demand electric charge service, the system comprising:

a request processing unit for receiving a charge session request for at least one of a plurality of power receivers and a plurality of mobile power transmitters;

a user dataset 330 having identification information of the plurality of power receivers, the identification information comprising membership information and charging characteristics; and a provider dataset 332 having charging information of a plurality of mobile power transmitters, the charging information comprising onboard charging system information and charging schedule, wherein the plurality of mobile power transmitters are each configured to be moveably deployed to a location to transfer charge to a power receiver.

In some embodiments, the method for establishing a charge session in an on-demand electric charge service comprises:

receiving a charge session request for at least one of a plurality of PRs 304;

identifying at least one of a plurality of MPTs 306 to address the received charge session request, based on a user dataset 330 and a provider dataset 332;

wherein the user dataset 330 comprises identification information of the plurality of PRs 304, the identification information comprising membership information and charging characteristics, and wherein the provider dataset 332 comprises charging information of the plurality of MPTs 306, the charging information comprising onboard charging system information and charging schedule.

In some embodiments, the method for establishing a charge session in an on-demand electric charge service comprises:

receiving a charge session request for at least one of a plurality of MPTs 306;

identifying at least one of a plurality of PRs 304 to address the received charge session request, based on a user dataset 330 and a provider dataset 332;

wherein the user dataset 330 comprises identification information of the plurality of PRs 304, the identification information comprising membership information and charging characteristics, and wherein the provider dataset 332 comprises charging information of the plurality of MPTs 306, the charging information comprising onboard charging system information and charging schedule.

In some embodiments, the term "establishing a charge session" refers to scheduling a charge session. In some embodiments, establishing a charge session refers to a search for an electric charge service availability. In some embodiments, a charge session refers to a date, time, or location at which charge service is delivered. In some embodiments, a charge session refers to a date, time, or location at which a charger, such as a battery, is delivered. In some embodiments, a charge session refers to a date, time, or location at which a charge service is received. In some embodiments, a charge session refers to a date, time, or location at which an MPT 306 is made available. In some embodiments, a charge session refers to a date, time, or location at which a PR 304 is made available. In some embodiments, a charge session refers to a date, time, or location at which an MPT 306 is made available to a plurality of PRs 304. In some embodiments, a charge session refers to a date, time, or location at which a plurality of MPTs 306 are made available to one or a plurality of PRs 304. In some embodiments, a charge session refers to a plurality of dates, times, or locations at which a charge service is delivered by one or a plurality of MPTs 306 or received by one or a plurality of PRs 304.

In some embodiments, a charge session is virtual. In some embodiments, time, date, or location of a charge session is virtual. In some embodiments, at least one of a plurality of PRs and MPTs is virtual. In some embodiments, virtual refers to not physically existing as such but made by software to appear to do so. In some embodiments, a charge session is virtual—carried out, accessed, or stored by means of a computer, especially over a network.

In some embodiments, a charge session is indefinite. In some embodiments, a charge session is on rolling basis. In some embodiments, a charge session is established when charging is initiated. In some embodiments, a charge session is established when charging is completed. In some embodiments, a charge session is established when charging is reported. In some embodiments, a charge session comprises a plurality of charge session requests. In some embodiments, a charge session is scheduled based on an estimated time of arrival to a location of a PR 304 or an MPT 306.

The term "request processing unit" includes, without limitations: a server 302, an operator, a user, a provider, a person, a machine, a device, an autonomous entity, an MPT 306, an MPT owner, operator, or fleet management staff, a PR 304, a PR owner, operator, or fleet management staff, a battery delivery owner, operator, or fleet management staff, an auxiliary power generator delivery owner, operator, or fleet management staff. In some embodiments, a request processing unit comprises a server 302 and a communication system 107. In some embodiments, a request processing unit receives a charge request via mail, web, phone, radio, text, fax, audio, and the like. In some embodiments, a request processing unit comprises an MPT operator or a PR user receiving a "match" via a web-based application. In some embodiments, a match refers to the connection of a PR 304 and a compatible MPT 306. In some embodiments, a match is digital or virtual.

In some embodiments, a system for establishing a charge session in an on-demand electric charge service comprises a request processing unit for receiving a charge session request for one or a plurality of PR 304 or one or a plurality of MPTs 306. In some embodiments, it is a PR 304 that requests a charge session. In some embodiments, it is an MPT 306 that request to deliver charge to a PR 304. In some embodiments, it is a discharged MPT 306 that requests a charge session in order to resume operation.

In some embodiments, "compatibility" is determined based on whether a PR 304 and an MPT 306 possess matching charging capabilities. In some embodiments, compatibility refers to matching physical characteristics, such as fitting in one parking spot. In some embodiments, compatibility refers to matching non-physical characteristics, such as autonomous capabilities. In some embodiments, compatibility refers to matching virtual characteristics, such as currency.

In some embodiments, a request processing unit receives a charge request from a server 302, a PR 304, a PR owner, a PR operator, a PR fleet management staff. In some embodiments, a request processing unit receives a charge request from an MPT 306, an MPT owner, operator, or fleet management staff. In some embodiments, a request processing unit receives a charge request from a third party, neither providing nor receiving charge.

In some embodiments, a user dataset 330 or PR database 330 comprises identification information of the plurality of power receivers, the identification information comprising membership information and charging characteristics.

In some embodiments, a provider dataset 332 or MPT database 332 having charging information of a plurality of mobile power transmitters, the charging information comprising onboard charging system information and charging schedule.

In some embodiments, at least one of a plurality of MPTs 306 is a deployable battery. In some embodiments, at least one of a plurality of MPTs 306 is a power generator, using fuels such as petroleum, natural gas, hydrogen fuel, alcohol, biofuel. In some embodiments, at least one of a plurality of MPTs 306 uses nuclear fuel to generate power for charging, such as a nuclear microreactor. In some embodiments, at least one of a plurality of MPTs 306 an auxiliary power generator such as a hydrogen fuel cell charges a battery that is used to charge a PR 302.

In some embodiments, an MPT 306 is dropped off at a location to transfer charge to a PR 304. In some embodiments, an MPT 306 arrives at a location where a PR 304 is parked. In some embodiments, an MPT 306 and a PR drive to a location with parking to charge. In some embodiments, a PR 304 arrives at a location where an MPT 306 is stationed. In some embodiments, an MPT 306 is stationed at a first location transferring charge to a PR 204 positioned at a second location. In some embodiments, the location of a charge session is a site, region, zone, neighborhood, platform, parking lot, parking structure, abandoned site, rooftop, space, parcel, or field.

In some embodiments, a plurality of PRs 304 subscribe to an on-demand electric charge service. In some embodiments, a plurality of MPTs 306 subscribe to an on-demand electric charge service. In some embodiments, an on-demand electric charge service is exclusive, limiting membership only to a certain class of PR 304 or MPT 306. In some embodiments, the exclusive service is only for PRs with a special charging system 314, such as a proprietary receptacle or adaptor. In some embodiments, all participants of an exclusive on-demand electric charge service are compatible, defined as having matching PR charging characteristics and MPT charging system 314. In some embodiments, user dataset 330 of an exclusive on-demand electric charge service contains identification information of a plurality of PRs 304, the identification information comprising membership information. In some embodiments, provider dataset 332 of an exclusive on-demand electric charge service contains charging information of a plurality of mobile power transmitters, the charging information comprising charging schedule.

In some embodiments, charging schedule of one or a plurality of MPTs 306 is open for drop-ins, such as charging on a rolling basis. In some embodiments, a PR 304 arrives at a location where an MPT 306 is stationed to receive charge without prior reservation or scheduling. In some embodiments, an MPT 306 charges a member PR 304 or drops off a charger, such as a battery, when convenient. In some embodiments, an MPT 306 is shipped to a location.

In some embodiments, a charge session is permitted by a PR 304 via a web-based application. In some embodiments, a charge session is permitted by an MPT 306 via a web-based application. In some embodiments, a charge session proceeds when a permit is generated to access charging platform of a PR 304.

In some embodiments, a system for establishing a charge session in an on-demand electric charge service, wherein at least one of the plurality of mobile power transmitters comprises:
 a control system 310,
 a power source system 312,
 a charging system 314; and
 a communication system 107.

In some embodiments, the control system 310 is a person overseeing the delivery or the reception of electric charge. In some embodiments, the control system 310 is a third party person, circuitry, machine, device, apparatus, or the like. In some embodiments, the control system 310 is a physical attachment, such as a receptacle holder. In some embodiments, the control system 310 comprises a deployment mechanism.

In some embodiments, the power source system 312 comprises a rechargeable electrochemical or electromechanical device. In some embodiments, the power source system 312 comprises an electrochemical or electromechanical power generator. In some embodiments, the charging system 314 comprises a cable with two receptacles, one at each end.

In some embodiments, one receptacle is connected to a PR 304 and the other coupled to an MPT 306. In some embodiments, the charging system 314 comprises a wireless charging platform. In some embodiments, an adaptor is used to charge. In some embodiments, a PR 304 provides the charging system 314, such as a cable to connect to a battery. In some embodiments, a PR 304 or an MPT 306 provide an adaptor. In some embodiments, a compatible charging system 314 is made available for a charge session. In some embodiments, a PR 304 is compatible for more than one type of charging system 314. In some embodiments, the charging system 314 is shared amongst a plurality of power source systems 312. In some embodiments, a stack of batteries are connected together and are used as one power source system 314 to charge a PR 304 via one or a plurality of cables.

In some embodiments, the communication system 107 is a physical note. n some embodiments, the communication system 107 is a ticket or token. In some embodiments, the communication system 107 is a barcode or encrypted media. In some embodiments, the communication system 107 is a text, audio, image, video, or digital media. In some embodiments, the communication system 107 comprises a verbal communication. In some embodiments, the communication system 107 comprises a one-time confirmation. In some embodiments, the communication system 107 comprises a one-time charge session request. In some embodiments, the communication system 107 comprises a transaction unit, such as a cash unit, a ticket machine, cloud-based application, or virtual token. In some embodiments, the communication system 107 is not physically existing as such but made by software to appear to do so. In some embodiments, the communication system 107 involves requests or transactions carried out, accessed, or stored by means of a computer, especially over a network.

In some embodiments, the request processing unit of a system for establishing a charge session in an on-demand electric charge service further maintains at least one of the user dataset 330 and the provider dataset 332. In some embodiments, the identification information of a PR 304 is updated. In some embodiments, the user dataset 330 is updated to append identification information of a new PR 304. In some embodiments, the charging information of an MPT 306 is updated. In some embodiments, the provider dataset 332 is updated to append charging information of a new MPT 306.

In some embodiments, the received charge session request is stored in a charge transfer history database, containing information such as the date, time, location, PR identification information, or MPT charging information of a charge session. In some embodiments, the charge transfer history database is updated. In some embodiments, the charge transfer history database is accessible by a server 302, a PR 304, an MPT 306, or a third party.

In some embodiments, the location for a charge session is determined based on the information stored on the charge transfer history database. In some embodiments, the location for a charge session is one of a plurality of locations stored on the charge transfer history database. In some embodiments, a charging station is installed at a popular location for a plurality of recurring MPT charge sessions. In some embodiments, the popular location is derived from the charge transfer history database. In some embodiments, one or a plurality of MPTs 306 are deployed to a location to serve as a temporary or permanent charging station(s).

In some embodiments, real-time location or estimated time of arrival to a location of one or a plurality of PRs 304 or MPTs 306 is provided. In some embodiments, the real-time location comprises geographical position(s), such as latitude or longitude. In some embodiments, the real-time location is a relative position, such as relative to an object. In some embodiments, the real-time location is a physical or virtual address. In some embodiments, the estimated time of arrival to a location is determined based on an MPT's charging schedule. In some embodiments, the estimated time of arrival to a location is updated in real-time.

Optimization is the selection of one element (desired element), with regard to some criterion, from some set of available alternatives. In some embodiments, a charge session date, time, or location is determined based on one or a plurality of the following criteria:
 1) schedule optimization of one or a plurality of PRs 304 or MPTs 306. In some embodiments, a charge session is established based on a plurality of scheduling conflicts, such as an MPT's other charge session(s), a PR's personal or travel schedule, or third-party schedule, for instance, operation hours of a parking structure or an office building.

2) route optimization of one or a plurality of PRs 304 or MPTs 306. In some embodiments, a charge session is established based on the shortest route(s) for one or a plurality of PRs 304 or MPTs 306.

3) traffic optimization of one or a plurality of PRs 304 or MPTs 306. In some embodiments, a charge session is established based on the route(s) of least traffic. In some embodiments, a charge session is established based on other schedules, including other established charge sessions.

4) pollution footprint of one or a plurality of PRs 304 or MPTs 306. In some embodiments, a charge session is established based on the total or average amount of carbon footprint (or carbon savings) of one or a plurality of charge sessions.

5) resource optimization of one or a plurality of PRs 304 or MPTs 306. In some embodiments, a charge session is established based on the amount of charge available on one or a plurality of PRs 304 or MPTs 306. In some embodiments, a charge session is established based on the amount of charge available on an MPT 306 to fully serve one or a plurality of PRs 304.

6) fee optimization of one or a plurality of PRs 304 or MPTs 306. In some embodiments, a charge session is established based on the highest possible income for one or a plurality of MPTs 306. In some embodiments, a charge session is established based on the lowest fees for one or a plurality of PRs 304. In some embodiments, a charge session is established "after-hours," for lower charge fees. In some embodiments, after-hours refers to low-demand periods, such as late evening, weekend, or holidays.

7) source of charge of one or a plurality of PRs 304 or MPTs 306. In some embodiments, a charge session is established based on the amount of clean electricity onboard one or a plurality of MPTs 306. In some embodiments, a charge session is established based on the amount of clean electricity requested for one or a plurality of PRs 304.

8) on-site amenities. In some embodiments, a charge session is established based on the available amenities at a charge session location. In some embodiments, on-site amenities include lodging services or accessible power outlet.

In some embodiments, one or a plurality of PRs 304 is also an MPT(s) 306 or vice versa. In some embodiments, an MPT 306 needed charge contacts one or a plurality of MPTs to establish a charge session. In some embodiments, a PR 304 is contacted to provide charge to an MPT 306 requesting charge. In some embodiments, a peer-to-peer charge service enables a first PR 304 with sufficient charge to transfer charge to a second PR 304 requesting electric charge to operate. In some embodiments, at least one of the first and the second PRs 304 is further an MPT 306.

In some embodiments, one or a plurality of MPTs 306 move(s) with a PR 304 to a second location. In some embodiments, the MPT 306 moving to a second location with a PR 304 is a trailing unit attached to the PR 304. In some embodiments, the MPT 306 moving to a second location with a PR 304 comprises a power source system 312. In some embodiments, the power source system 312 is placed inside the PR 304 to electric charge while the PR continues operation. In some embodiments, the power source system 312 is attached to or placed on or below the PR 304. In some embodiments, one or a plurality of MPTs 306 move(s) a PR 304 to a second location. In some embodiments, one or a plurality of MPTs 306 arrive(s) at a first location, move(s) the PR 304 to a second location, and return the PR 304 to the first location after charging is completed. In some embodiments, one or a plurality of MPTs 306 arrive(s) at a first location, move(s) the PR 304 to a second location, and return the PR 304 to a third location after charging is completed.

In some embodiments, a system for establishing a charge session in an on-demand electric charge service further provides a second service selected from a list of driving, towing, fueling, parking, transaction documentation, reservation, maintenance, work space, staffing, internet access, autonomy, navigation, surveillance, safety, security, insurance, emergency service, accessibility services, roadside assistance, crisis assistance, communication, monitoring, ride, catering, delivery, personal care, health care, housing, shopping, and lodging.

In some embodiments, an MPT 306 provides a service to a member PR 304 in addition to charging. In some embodiments, an MPT 306 provides a service to a member PR 304 other than charging. In some embodiments, an MPT 306 providing a second service to a PR 304 may not have compatible charging system 314. In some embodiments, an MPT 306 operator drives or arranges a PR 304 to be driven to a location. In some embodiments, an MPT 306 tows a PR 304 to a location. In some embodiments, an MPT 306 tows a PR 304 to a location while charging. In some embodiments, an MPT 306 tows a PR 304 to a location to charge. In some embodiments, an MPT 306 further provides fuel to a PR 304. In some embodiments, an MPT 306 parks or arranges a PR 304 to be parked at a location. In some embodiments, an MPT 306 comprises a platform for a PR 304 to park on while charging. In some embodiments, an MPT 306 issues transaction documentation for a charge session. In some embodiments, an MPT 306 reserves a service, such as a table at a restaurant, or arranges a reservation for a PR 304. In some embodiments, an MPT 306 provides maintenance service(s), such as dusting, fixing, or car wash, or arranges maintenance for a PR 304 with a third-party maintenance provider.

In some embodiments, an MPT 306 provides space, such as a work space, lodging space, self-care space, personal care space, safe space, healthcare space, housing space, practice space, privacy space, shopping space, or arranges a space for a PR 304 to access or use. In some embodiments, an MPT 306 provides staffing services, such as elder care or cleaning services, or arranges a staffing service for a PR 304. In some embodiments, an MPT 306 provides communication services, such as internet, phone, fax, pager, radio, or text services, or arranges a service for a PR 304 as complementary or for a fee.

In some embodiments, an MPT 306 an autonomous service, such as driver-less tow service, or arranges a an autonomous service for a PR 304. In some embodiments, an MPT 306 provides navigation service(s) or arranges the service(s) for a PR 304. In some embodiments, an MPT 306 provides service(s), such as surveillance, safety, security, insurance, monitoring, theft or violator protection, emergency response, roadside assistance, crisis assistance, or arranges the service(s) for a PR 304. In some embodiments, an MPT 306 provides a ride to a PR 304, or arranges a ride for a member PR 304. In some embodiments, an MPT 306 caters to a PR 304, or arranges catering service for a member PR 304. In some embodiments, an MPT 306 delivers to a PR 304, or arranges delivery service, such as packages, for a member PR 304.

In some embodiments, a PR 304 or an MPT 306 proceed to establish a charge session. In some embodiments, the PR 304 or the MPT 306 is not a "recognized" member of the charge service network. In some embodiments, a recognized member refers to a PR 304 whose identification information is already included in a user dataset 330. In some embodiments, a recognized member refers to an MPT 306 whose charging information is included in a provider dataset 332. In some embodiments, a recognized member is a PR 304 or an MPT 306 with a subscription. In some embodiments, identification information of a PR 304 or charging information of an MPT 306 deleted after a charge session.

In some embodiments, an on-demand electric charge service is provided to a new or an un-recognized PR 304 or an MPT 306. In some embodiments, a peer-to-peer charge session is established wherein an MPT 306, a PR 304, or an electric charge donor delivers electric charge to a PR 304, an MPT 306, or an electric charge recipient. In some embodiments, an established charge session is insured. In some embodiments, insuring a charge session provides peace of mind for any unexpected circumstances, such as financial fraud or faulty charging. In some embodiments, insurance is provided to a PR 304 or an MPT 306.

In some embodiments, a system for establishing a peer-to-peer charge session in an on-demand electric charge service comprises:

a request processing unit for receiving a peer-to-peer charge session request for at least one PR 304, the peer-to-peer charge session request comprising identification information of the at least one PR 304, the identification information comprising membership information and charging characteristics; and a provider dataset 332 having charging information of a plurality of mobile power transmitters, the charging information comprising onboard charging system information and charging schedule, wherein the plurality of MPTs 306 are each configured to be moveably deployed to a location to transfer charge to a PR 304.

In some embodiments, a method for establishing a peer-to-peer charge session in an on-demand electric charge service comprises:

receiving a peer-to-peer charge session request for at least one PR 304, the received peer-to-peer charge session request comprising identification information of the at least one PR 304, the identification information comprising membership information and charging characteristics;

identifying at least one of a plurality of MPTs 306 to address the received peer-to-peer charge session request, based on the identification information of the at least one power receiver and a provider dataset;

wherein the provider dataset 330 comprises charging information of the plurality of MPTs 306, the charging information comprising onboard charging system information and charging schedule.

In some embodiments, an MPT 306 is a donor in an on-demand electric charge service. In some embodiments, an MPT 306 requests for a peer-to-peer charge session to deliver electric charge to one or a plurality of PRs 304. In some embodiments, an MPT 306 requests for a peer-to-peer charge session to deliver electric charge to one or a plurality of MPTs 306. In some embodiments, a system for establishing a peer-to-peer charge session in an on-demand electric charge service comprises:

a request processing unit for receiving a peer-to-peer charge session request for at least one MPT 306, the peer-to-peer charge session request comprising charging information of the at least one MPT 306, the charging information comprising onboard charging system information and charging schedule; and a user dataset 330 having identification information of a plurality of PRs 304, the identification information comprising membership information and charging characteristics, wherein the at least one MPT 306 is configured to be moveably deployed to a location to transfer charge to a PR 304.

A method for establishing a peer-to-peer charge session in an on-demand electric charge service, the method comprising:

receiving a peer-to-peer charge session request for at least one MPT 306, the received peer-to-peer charge session request comprising charging information of the at least one MPT 306, the charging information comprising onboard charging system information and charging schedule;

identifying at least one of a plurality of PRs 304 to address the received peer-to-peer charge session request, based on a user dataset 330 and the charging information of the at least one MPT 306;

wherein the user dataset 330 having identification information of the plurality of PRs 304, the identification information comprising membership information and charging characteristics.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for establishing a charge session in an on-demand electric charge service, the system comprising:

a request processing unit for receiving a charge session request for at least one of; a plurality of power receivers or a plurality of mobile power transmitters;

a user dataset having identification information of the plurality of power receivers, the identification information comprising membership information and charging characteristics; and a provider dataset having charging information of the plurality of mobile power transmitters, the charging information comprising onboard charging system information of the plurality of mobile power transmitters and charging schedule of the plurality of mobile power transmitters, wherein the plurality of mobile power transmitters are each configured to be moveably deployed to a location to transfer charge to a power receiver.

2. The system for establishing a charge session in an on-demand electric charge service according to claim 1, wherein at least one of the plurality of mobile power transmitters comprises:

a control system, a power source system, a charging system; and a communication system.

3. The system for establishing a charge session in an on-demand electric charge service according to claim 1, wherein the request processing unit further maintains at least one of the user dataset and the provider dataset.

4. The system for establishing a charge session in an on-demand electric charge service according to claim 1, wherein the charging characteristics include maximum current, maximum voltage, recommended charging duration, charging schedule, or charging type, wherein the charging type is contact charging or non-contact charging.

5. The system for establishing a charge session in an on-demand electric charge service according to claim 1, wherein the onboard charging system information includes onboard receptacle type(s), adaptors, available charge, operational current and voltage characteristics, percentage of charge from renewable sources, onboard safety and security capabilities, or self-charging information of the plurality of mobile power transmitters, wherein the self-charging information includes self-charging time, duration or location.

6. The system for establishing a charge session in an on-demand electric charge service according to claim 1, wherein the charging schedule includes radius of operation, operational dates and hours, available charging times, reserved charging locations, reserved charging times, or reserved charging durations.

7. The system for establishing a charge session in an on-demand electric charge service according to claim 1, wherein the received charge session request is stored in a charge transfer history database.

8. The system for establishing a charge session in an on-demand electric charge service according to claim 1, wherein at least one of real-time location or estimated time of arrival to the location of at least one of the plurality of power receivers or the plurality of mobile power transmitters is provided.

9. The system for establishing a charge session in an on-demand electric charge service according to claim 1, wherein the location is determined based on at least one of:
   schedule optimization of at least one of the plurality of power receivers or the plurality of mobile power transmitters;
   route optimization of at least one of the plurality of power receivers or the plurality of mobile power transmitters;
   traffic optimization of at least one of the plurality of power receivers or the plurality of mobile power transmitters;
   pollution footprint of at least one of the plurality of power receivers or the plurality of mobile power transmitters;
   resource optimization of the plurality of mobile power transmitters;
   income optimization of the plurality of mobile power transmitters;
   source of charge of the plurality of mobile power transmitters; or
   on-site amenities.

10. The system for establishing a charge session in an on-demand electric charge service according to claim 1, wherein at least one of the plurality of power receivers or the plurality of mobile power transmitters is an electric vehicle.

11. The system for establishing a charge session in an on-demand electric charge service according to claim 1, wherein at least one of the plurality of mobile power transmitters moves with the at least one of the plurality of power receivers to a second location.

12. The system for establishing a charge session in an on-demand electric charge service according to claim 1, further providing a second service including driving, towing, fueling, parking, transaction documentation, reservation, maintenance, work space, staffing, internet access, autonomy, navigation, surveillance, safety, security, insurance, emergency service, accessibility services, roadside assistance, crisis assistance, communication, monitoring, ride, catering, delivery, personal care, health care, housing, shopping, or lodging.

13. A method for establishing a charge session in an on-demand electric charge service, the method comprising:
   receiving a charge session request for at least one of a plurality of power receivers;
   identifying at least one of a plurality of mobile power transmitters to address the received charge session request, based on:
   membership information and charging characteristics of the plurality of power receivers, and
   charging system information and charging schedule of the plurality of mobile power transmitters.

14. The method for establishing a charge session in an on-demand electric charge service according to claim 13, further providing to at least one of the at least one of a plurality of power receivers or the at least one of a plurality of mobile power transmitters a service selected from a list of driving, towing, fueling, parking, transaction documentation, reservation, maintenance, work space, staffing, internet access, autonomy, navigation, surveillance, safety, security, insurance, emergency service, accessibility services, roadside assistance, crisis assistance, communication, monitoring, ride, catering, delivery, personal care, health care, housing, shopping, or lodging.

15. A method for establishing a charge session in an on-demand electric charge service, the method comprising:
   receiving a charge session request for at least one of a plurality of mobile power transmitters;
   identifying at least one of a plurality of power receivers to address the received charge session request, based on:
   membership information and charging characteristics of the plurality of power receivers, and
   onboard charging system information and charging schedule of the plurality of mobile power transmitters.

16. The method for establishing a charge session in an on-demand electric charge service according to claim 15, further providing to at least one of the at least one of a plurality of power receivers or the at least one of a plurality of mobile power transmitters a service including driving, towing, fueling, parking, transaction documentation, reservation, maintenance, work space, staffing, internet access, autonomy, navigation, surveillance, safety, security, insurance, emergency service, accessibility services, roadside assistance, crisis assistance, communication, monitoring, ride, catering, delivery, personal care, health care, housing, shopping, and lodging.

* * * * *